(12) United States Patent
Rustomji et al.

(10) Patent No.: US 12,494,508 B2
(45) Date of Patent: *Dec. 9, 2025

(54) CHEMICALLY INERT ADDITIVES FOR ELECTROCHEMICAL CELLS

(71) Applicant: SOUTH 8 TECHNOLOGIES, INC., San Diego, CA (US)

(72) Inventors: Cyrus S. Rustomji, San Diego, CA (US); Jungwoo Lee, San Diego, CA (US); James Royer, San Diego, CA (US); Miguel Ceja, Manteca, CA (US)

(73) Assignee: South 8 Technologies, Inc., San Diego, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/920,879

(22) Filed: Oct. 19, 2024

(65) Prior Publication Data

US 2025/0046872 A1    Feb. 6, 2025

Related U.S. Application Data

(63) Continuation of application No. 18/383,255, filed on Oct. 24, 2023, now Pat. No. 12,136,702, which is a continuation of application No. PCT/US2022/031594, filed on May 31, 2022.

(60) Provisional application No. 63/195,592, filed on Jun. 1, 2021.

(51) Int. Cl.
H01M 10/0569 (2010.01)
H01M 10/0567 (2010.01)
H01M 50/183 (2021.01)

(52) U.S. Cl.
CPC ... H01M 10/0567 (2013.01); H01M 10/0569 (2013.01); H01M 50/183 (2021.01); H01M 2300/0028 (2013.01)

(58) Field of Classification Search
None
See application file for complete search history.

(56) References Cited

FOREIGN PATENT DOCUMENTS

WO    WO-2020163879 A1 *  8/2020  .......... H01M 50/636

* cited by examiner

*Primary Examiner* — Haixia Zhang
(74) *Attorney, Agent, or Firm* — Manuel de la Cerra

(57) ABSTRACT

A safe electrolyte comprising a liquefied gas solvent that will transition from a liquid state to a gas state ("gas off") at a pressure of 100 kPa and at a temperature of 293.15 K is disclosed. The electrolyte is a mixture of a compressed gas solvent and a salt, and includes a hydrocarbon solvent of a sufficient concentration to promote solubility of the salt into the compressed gas solvent without phase separation. The molar ratio of the hydrocarbon solvent to the compressed gas solvent is in a range of 10:90 to 90:10. The hydrocarbon solvent may be selected to lower the global warming potential (GWP) of the electrolyte by at least 10%. This safe electrolyte can be used to manufacture an electrochemical energy storage device.

6 Claims, 16 Drawing Sheets

CHEMICALLY INERT ADDITIVES FOR ELECTROCHEMICAL CELLS

CROSS-REFERENCE TO RELATED APPLICATIONS

This application claims priority as a continuation of U.S. application Ser. No. 18/383,255, filed on Oct. 24, 2023, which claims priority as a continuation of PCT US22/31594, filed on May 31, 2022, which claims priority to U.S. application 63/195,592, filed on Jun. 1, 2021. The entire contents of these applications are incorporated herein by reference.

This application is related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; U.S. Pat. No. 11,049,668 issued Jun. 29, 2021; U.S. Pat. No. 11,342,615 issued on May 24, 2022; U.S. Pat. No. 10,784,532 issued on Sep. 22, 2020; U.S. Pat. No. 11,984,614 issued on May 14, 2024; U.S. Pat. No. 11,958,679 issued on Apr. 16, 2024; PCT/US23/17720 filed on Apr. 6, 2023; PCT/US23/28104 filed on Jul. 19, 2023; PCT/US23/28105 filed on Jul. 19, 2023; PCT/US24/16784 filed on Feb. 21, 2023; PCT/US24/18746 filed on Mar. 6, 2024; PCT/US24/33428 filed on Jun. 11, 2024; PCT/US24/25771 filed on Apr. 23, 2024; PCT/US24/31912 filed on May 31, 2024; U.S. Application 63/534,213 filed on Aug. 22, 2023; U.S. Application 63/418,703 filed on Oct. 24, 2022; PCT/US24/27501 filed on May 2, 2024; PCT/US24/31325 filed on May 29, 2024; U.S. Application 63/652,616 filed on May 28, 2024; PCT/US24/40203 filed on Jul. 30, 2024; U.S. application Ser. No. 18/788,809 filed on Jul. 30, 2024; U.S. application Ser. No. 18/643,134 filed on Apr. 23, 2024; U.S. application Ser. No. 18/807,938 filed Aug. 17, 2024; and U.S. Application 63/684,297.

STATEMENT REGARDING FEDERALLY SPONSORED R&D

This invention was made with U.S. government support under grant 1831087 awarded by the U.S. National Science Foundation (NSF). The U.S. government has certain rights in the invention.

FIELD OF THE INVENTION

Embodiments of the invention relate to compositions and chemical formulations of electrolytes for use in electrochemical energy devices, such as batteries and electrochemical capacitors. Devices using the compositions and methods of use of the compositions are also provided.

BACKGROUND

Electrochemical energy storage devices, such as batteries and double-layer capacitors, utilize an ion-conducting electrolyte solution to carry charge between the positive and negative electrodes. Typically, these electrolytes are a liquid at a standard room temperature of 293.15 K and at a standard pressure (approximately 1.01325 bar). The electrolyte solutions use a mixture of some quantity of solvent, co-solvents, salt, and additional additives for improved device performance. There is often one primary solvent, which is used to solubilize the salt, as well as additional co-solvents, which improve cell performance. For instance, a common electrolyte solvent might include ethylene carbonate for Li-ion battery cells, but additions of dimethyl carbonate, ethylene carbonate, propylene carbonate, acetonitrile, fluoroethylene carbonate, and vinyl carbonate, among others, might be used to improve the conductivity of the electrolyte or the cycle life of the cell. A liquefied gas electrolyte utilizes solvents and co-solvents that are gaseous at room temperature and standard pressure but may be used as an electrolyte solvent in the liquid phase. Identifying performance-enhancing co-solvents is important to improving the electrochemical performance of the liquefied gas electrolytes.

SUMMARY

Embodiments of the present disclosure relate to chemical formulations, electrolyte compositions, electrochemical devices using thereof, and methods of use thereof. Some disclosed embodiments relate to novel formulations for electrolytes comprising a liquefied gas solvent.

One embodiment relates to a rechargeable electrochemical device that includes: an ionically conducting electrolyte comprising one or more liquefied gas solvent(s), one or more salt(s), and one or more additive(s); a housing that encloses the ionically conducting electrolyte and structured to provide a pressurized condition to the liquefied gas solvent; and at least two conducting electrodes in contact with the ionically conducting electrolyte. The one or more solvents or co-solvents, when combined, may collectively also be referred to as the liquefied gas solvent. The one or more salts, when combined, may collectively also be referred to as the salt. The one or more additives, when combined, may collectively also be referred to as the additive. The solvent and the salt, when combined, may collectively also be referred to as the electrolyte. The solvent, the salt, and the additive, when combined, may collectively also be referred to as the electrolyte.

In some embodiments, the liquefied gas solvent is capable of being placed under a compressive pressure equal to or greater than the liquefied gas solvent's vapor pressure at a temperature when the compressive pressure is applied, thereby keeping the liquefied gas solvent in a liquid phase. In some embodiments, the liquefied gas solvent has a vapor pressure above an atmospheric pressure of 100 kPa at a room temperature of 293.15 K—i.e., standard pressure and temperature.

In some embodiments, the liquefied gas solvent comprises one or more materials selected from the group consisting of: dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, difluoro ethylene, nitrous oxide, nitrogen dioxide, nitrogen oxide, carbon disulfide, hydrogen fluoride, hydrogen chloride, methane, ethane, propane, n-butane, iso-butane, cyclopropane, cyclopropane, ethene, propene, butene, cyclobutene, acetylene, isomers thereof, and a combination thereof. In some embodiments, the liquefied gas solvent comprises fluoromethane, carbon dioxide, and n-butane. In some embodiments, the liquefied gas solvent comprises fluoromethane, difluoromethane, and propane. In some embodiments, the liquefied gas solvent comprises fluoromethane, difluoromethane, carbon dioxide, and iso-butane. In some embodiments, the liquefied gas solvent comprises difluoromethane, carbon dioxide, and propene. In some embodiments, the liquefied gas solvent comprises fluoromethane, dimethyl ether, carbon dioxide, and methane. In some embodiments, the liquefied gas solvent comprises dimethyl ether and n-butane.

In some embodiments, a component of the solvent may be liquid at room temperature and atmospheric pressure, such as pentane, hexane, heptane, octane, cyclopentane, cyclohexane, cycle heptane, cyclooctane, and isomers thereof.

Another embodiment relates to a rechargeable lithium battery. The rechargeable lithium battery may include an ionically conducting electrolyte. The ionically conducting electrolyte may comprise a liquefied gas solvent. The ionically conducting electrolyte may comprise one or more salt(s). In some embodiments, the ionically conducting electrolyte may further comprise one or more gas, liquid, or solid additive(s), selected from the group consisting of: non-cyclic carbonate, cyclic carbonate, non-cyclic ether, cyclic ether, nitrile, phosphates, and combinations thereof. In some embodiments, the rechargeable lithium battery may also include a housing that encloses two conducting electrodes and the ionically conducting electrolyte. In some embodiments, the liquefied gas solvent has a vapor pressure above an atmospheric pressure of 100 kPa at a room temperature of 293.15 K. In some such embodiments, the liquefied gas solvent may be capable of being placed under a compressive pressure equal to, or greater than, the liquefied gas solvent's vapor pressure at a temperature when the compressive pressure is applied, thereby keeping the liquefied gas solvent in a liquid phase.

In an exemplary electrochemical device using a liquefied gas electrolyte composed of one or more liquefied gas components with any combination of one or more liquid components, one or more solid components, or one or more salt components, the electrodes are composed of any combination of two electrodes of the intercalation type, such as graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide, carbon, or chemical-reaction electrodes, such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride, or electrostatic electrodes using a high-surface-area electrically conducting material, such as activated carbon, carbon black, carbon nanotubes, graphene, or of a metallic electrode with lithium, sodium, magnesium, tin, aluminum, calcium, titanium zinc metal or metal alloy, including lithium, sodium, tin, magnesium, aluminum, calcium, titanium, zinc, or any combination thereof. These components may be combined with various binder polymer components, including polyvinylidene fluoride, carboxymethyl cellulose, styrene-butadiene rubber, or polytetrafluoroethylene, in order to maintain structural integrity of the electrode.

In some embodiments, the additives are used in combination with a liquefied gas solvent and lithium-, sodium-, zinc-, calcium-, magnesium-, aluminum-, or titanium-based salts. Further, the one or more liquefied gas solvent solution(s) or electrolyte(s) may be combined with one or more salt(s), including one or more of: lithium bis(trifluoromethanesulfonyl)imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato)borate (LiBOB), lithium hexafluorostannate, lithium difluoro(oxalato)borate (LiDFOB), lithium bis(fluorosulfonyl)imide (LiFSI), lithium aluminum fluoride (LiAlF3), lithium nitrate (LiNO3), lithium chloroaluminate, lithium tetrafluoroborate (LiBF4), lithium tetrachloroaluminate, lithium difluorophosphate, lithium tetrafluoro(oxalato)phosphate, lithium difluorobis(oxalato)phosphate, lithium borate, lithium oxolate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium di-ketosuccinate or any corresponding salts with the positive charged lithium cation substituted for sodium or magnesium or any combinations thereof. Further useful salts include those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium, N,N-diethyl-N-methyl-N(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylammonium, N,N-Dimethyl-N-ethyl-N-phenylethylammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl)pyrrolidinium, 1-Methyl-1-(3-methoxypropyl)pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalate)borate, bis(trifluoromethanesulfonyl)imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

A safe electrolyte comprising a liquefied gas solvent that will transition from a liquid state to a gas state ("gas off") at a pressure of 100 kPa and at a temperature of 293.15 K is disclosed. A first mixture is formed from a first electrolyte component (one or more solvents) mixed with a second electrolyte component (one or more hydrocarbon co-solvents). The addition of the second electrolyte component (1)

lowers the vapor pressure of the first mixture by at least 10% compared to the vapor pressure of the first component alone, when measured at 293.15 K; and (2) results in a vapor pressure of the first mixture above 100 kPa at a temperature of 293.15 K. The addition of the second electrolyte component may also lower the global warming potential (GWP) of the first mixture by at least 10% compared to the GWP of the first component alone. The safe liquefied gas electrolyte is formed by mixing a third electrolyte component (one or more salts) to the first mixture. This safe liquefied gas electrolyte can then be used to manufacture an electrochemical energy storage device.

Alternative or additional embodiments described herein provide a method of using the electrolyte composition or device comprising one or more of the features of the foregoing description or of any description elsewhere herein.

7.0 DETAILED DESCRIPTION

Figure 1:
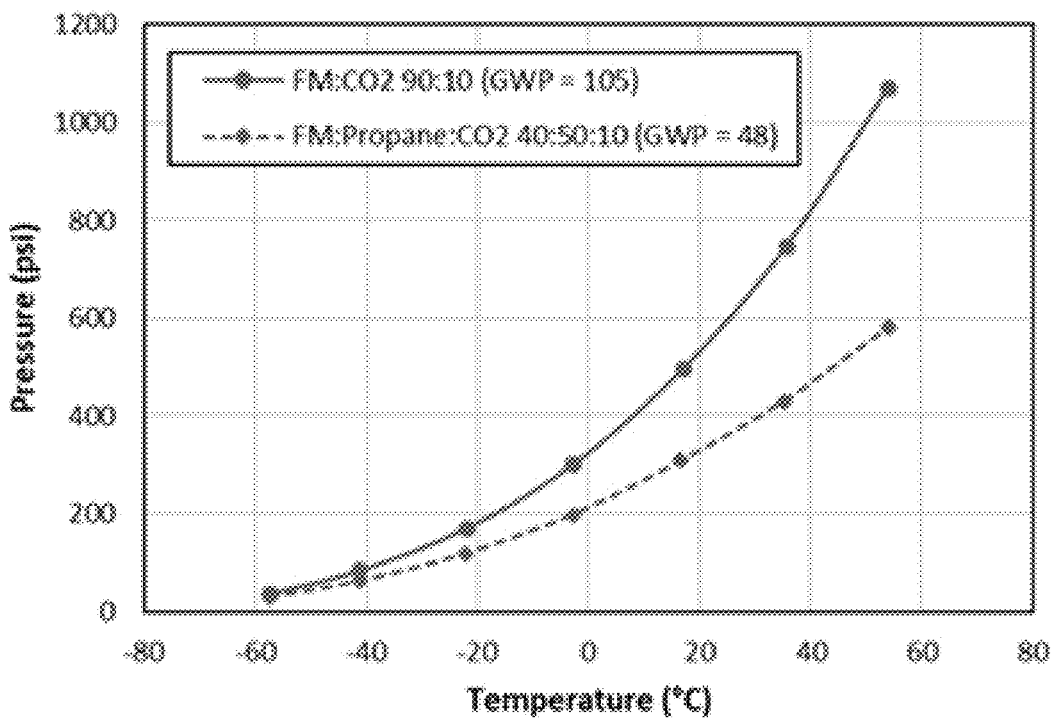
FIG. 1 compares the pressure of various liquefied gas electrolytes; Electrolyte 1: 1.0M LiTFSI and 2.0M trimethyl phosphate in 90 parts by mole fluoromethane and 10 parts by mole carbon dioxide (solid line); Electrolyte 2: 1.0M LiTFSI and 2.0M triethyl phosphate in 40 parts by mole fluoromethane, 50 parts by mole propane, and 10 parts by mole carbon dioxide (dashed line).

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth to provide a thorough understanding of the present invention. Particular example embodiments of the present invention may be implemented without some or all of these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

Electrochemical energy storage devices, such as batteries and double-layer capacitors, utilize an ion-conducting electrolyte solution to carry charge between positive and negative electrodes. Typically, these electrolytes are a liquid at a standard room temperature of 293.15 K and at a standard pressure (approximately 1.01325 bar). The electrolyte solutions use a mixture of some quantity of solvent, co-solvents, one or more salts, and one or more additional additives for improved device performance. There is often one primary solvent, which is used to solubilize the salt, as well as additional co-solvents, which improve cell performance. For instance, a common electrolyte solvent might include ethylene carbonate for Li-ion battery cells, but additions of dimethyl carbonate, ethylene carbonate, propylene carbonate, acetonitrile, fluoroethylene carbonate, and vinyl carbonate, among others, might be used to improve conductivity of the electrolyte or the cycle life of the cell. Liquefied gas electrolytes utilize solvents and co-solvents that are gaseous at room temperature and standard pressure but may be used as an electrolyte solvent in the liquid phase, either by decreasing the temperature or by holding the solvent under its own vapor pressure. Identifying performance-enhancing co-solvents is important to improving the electrochemical performance of the liquefied gas electrolytes.

Liquefied gas electrolytes may use fluoromethane or difluoromethane as a primary solvent to solubilize salts in electrochemical devices such as lithium batteries or electrochemical capacitors. However, these solvents typically have high vapor pressures and high global warming potentials (GWP). For instance, at a room temperature of 293.15 K, the vapor pressure of fluoromethane and difluoromethane is around 493 and 214 psi, respectively. The GWP (global warming potential, a multiple of carbon dioxide's global warming potential) of fluoromethane and difluoromethane is around 92 and 675, respectively. It would be beneficial to operate an electrochemical device cell having a lower pressure, a lower GWP, or both. A lower pressure would lower the mechanical packaging burden by using thinner metal housings to place the cell and to contain the liquefied gas electrolyte. A lower GWP would be more environmentally friendly.

Ideally, liquefied gas electrolytes would use co-solvents that, in addition to lowering pressure, lowering GWP, or both, would also be chemically beneficial to the performance of the cell. Often co-solvents that are beneficial in forming solid electrolyte interphases (SEI) on either the anode or cathode, are identified. However, chemically inert co-solvents would also be beneficial in lowering the chemical reactions within the cell between electrolyte and electrodes that may degrade cell performance.

Because of the high reactivity of lithium metal, the material is difficult to use as an anode in high-energy lithium battery cells. Though lithium metal has a high capacity-to-weight ratio, it suffers from a high rate of reactivity with the electrolyte. During cell cycling, the SEI layer on the surface of lithium metal may crack and may expose fresh lithium metal, which would react with the electrolyte, lowering the efficiency of the cell and reducing the cycle life of the battery cell. It would be beneficial to have an electrolyte whose solvent has a lower reactivity with lithium metal to increase cell efficiency and cell cycle life. Similar to lithium, sodium, zinc, magnesium, aluminum, potassium, or their alloys may all be used inside a battery as electrodes and would benefit from a lower-reacting electrolyte solvent.

Some chemically inert co-solvents may include hydrocarbon solvents. Hydrocarbon solvents have very low electrochemical reactivity and are stable. These hydrocarbon solvents may include methane, ethane, propane, n-butane, iso-butane, cyclopropane, cyclopropane, ethene, propene, butene, cyclobutene, cyclobutene, acetylene, pentane, hexane, heptane, octane, cyclopentane, cyclohexane, cycloheptane, cyclooctane, isomers thereof, and combinations thereof. In some embodiments, the liquefied gas solvent comprises fluoromethane, carbon dioxide, and n-butane. In some embodiments, the liquefied gas solvent comprises fluoromethane, difluoromethane, and propane. In some embodiments, the liquefied gas solvent comprises fluoromethane, difluoromethane, carbon dioxide, and iso-butane. In some embodiments, the liquefied gas solvent comprises difluoromethane, carbon dioxide, and propene. In some embodiments, the liquefied gas solvent comprises fluoromethane, dimethyl ether, carbon dioxide, and methane. In some embodiments, the liquefied gas solvent comprises dimethyl ether and n-butane.

Because of their low chemical reactivity, highly reactive alkali or alkaline metals such as sodium and lithium metal are often transported in hydrocarbon solvents or mineral oil, which is a mixture of long-chained hydrocarbon solvents. Other highly reactive compounds such as butyl lithium, are also stored in hydrocarbon solvents such as hexanes.

Hydrocarbon solvents that may be used in liquefied gas electrolytes may include saturated or unsaturated hydrocarbons. This may include alkanes, alkenes, or alkylenes. This may further include hydrocarbons that are gaseous or non-gaseous at a standard room temperature of 293.15 K and standard pressure (approximately 1.01325 bar).

The use of hydrocarbon solvents in liquefied gas electrolytes may improve electrolyte properties, such as lower vapor pressure, lower GWP, and higher chemical stability.

This is because many of the hydrocarbon liquefied gas solvents have vapor pressures lower than that of other liquefied gas solvents (ex., fluoromethane, carbon dioxide). Further, hydrocarbon solvents have GWPs close to zero, which may substantially lower the GWP of the full electrolyte. Lastly, adding hydrocarbon solvents to the electrolyte will help improve the chemical stability of the full electrolyte solution by lowering the reactivity of the more chemically-active species in the electrolyte.

Lowering the pressure of the liquefied gas electrolyte can be beneficial from a mechanical design point of view. When an electrolyte has too high of a vapor pressure, the cell housing may need thicker walls to support the pressure, since the thicker walls impart an added strength onto the cell housing. The cell housing will require the thicker walls to ensure good sealing and no leakage during the life of the cell. Having thicker walls will, in turn, entails less desirable characteristics as well, such as added volume, mass, and cost to the cell. Alternatively, stronger metals might be used with thinner walls, such as stainless steel and titanium, but at an added cost to the cell. Thus, lowering the vapor pressure of the electrolyte can have beneficial properties. The less stringent requirements on the mechanical cell housings may be achieved with a reduced vapor pressure of the liquefied gas electrolyte having a vapor pressure around 100 kPa, or more desirably, a vapor pressure between 100 kPa and 100 MPa, or more desirably 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 3, 4, 5, 6, 7, 8, 9, 10 MPa at a room temperature of 293.15 K.

It has been found that having a pressurized electrolyte system can also be beneficial to the electrochemical device for several reasons. During standard manufacturing with a liquid-based electrolyte, a cell is first put into a vacuum state, followed by liquid electrolyte injection into the cell, followed by several hours of waiting for the cell to completely wet on all electrode and separator surfaces. Often, the cell undergoes a first electrolyte injection step, followed by a wait time to allow for electrolyte wetting, followed by a second electrolyte injection step to ensure full wettability. Until full wetting takes place, the cell is not ready to be charged. Moreover, a cell that is not fully wetted is a leading cause of the scrap rate in the manufacturing process, which necessitates a higher cost of cells if not minimized. With a pressurized liquefied gas electrolyte, the cell is rapidly wetted due to the high pressure of the electrolyte penetrating all surfaces of the electrodes and separator. This wetting process takes place in seconds, as opposed to hours, reducing manufacturing time and cost. Further, this allows for higher confidence in a fully wetted cell and reduces scrap rate, thus reducing overall cost of the cell manufacturing. The wetting process can be enhanced by using pressurized electrolytes having a vapor pressure around 100 kPa, or more desirably a vapor pressure between 100 kPa and 100 MPa, or more desirably around 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 3, 4, 5, 6, 7, 8, 9, or 10 MPa at a room temperature of 293.15 K.

Another beneficial property of having a pressurized electrolyte is a reduced risk of safety hazards from physical or electrical cell abuse. In common Li-ion battery cells, it is normal to see thermal runaway reactions under physical or electrical abuse such as over temperature, over charge, crush, nail penetration, or short circuit events. This is due to exothermic reactions within the cell that may be triggered at relatively low temperatures, ex. around +100° C. This "thermal runaway onset temperature" triggers these additional exothermic reactions, which can then drive a cell to catch fire and explode, causing a serious safety and health concern. Moreover, the heat generated from one cell may also propagate to an adjacent cell and trigger that adjacent cell to also go into thermal runaway, creating a thermal propagation event across the battery pack. The flammable liquid electrolyte is generally the critical component driving these thermal runaway reactions. Once the cell warms up to the auto-combustion temperature of the electrolyte, explosive reactions may occur. Moreover, a short-circuited cell requires both an electrical pathway and an ionic pathway between the anode and cathode. The electrolyte carries the ions within the cell, and thus contributes to cell short circuit.

In contrast, a pressurized liquefied-gas electrolyte system carries the safety advantage that under physical or electrical abuse, the cell may warm up to a pre-determined venting temperature, at which time the cell is allowed to vent the pressurized liquefied-gas solvent or liquefied-gas electrolyte to the atmosphere, leaving behind a "dry cell" without any flammable or ionically conducting electrolyte. Once vented, the cell is allowed to fail safely without any thermal runaway reactions occurring. For example, under over temperature conditions, the cell might be warmed up to +240° C. Before reaching the +200° C. temperature, the cell may cross a vent temperature, at which point the vapor pressure of the liquefied gas electrolyte within the cell reaches a pressure high enough to cause a vent engineered on the cell to open, releasing pressure and the electrolyte material. A vent temperature, ex., +80° C., below the thermal runaway temperature, ex. +100° C. is ideal, so that the flammable electrolyte may vent away from the cell prior to any thermal runaway reactions occurring, thereby allowing the cell to fail safely even at temperatures as high as +240 C. Similarly, a cell may be overcharged, and during the overcharge event warms up. When the cell reaches the vent temperature, the liquefied gas electrolyte will be released from the cell, and the cell will fail safely. Similarly, during a short-circuit event, the cell may warm up rapidly due to the high discharge current. When the cell warms to the vent temperature, the liquefied gas electrolyte may be allowed to vent from the cell, and the cell can fail safely rather than go into thermal runaway. A cell using the liquefied gas electrolyte may also fail safely without a temperature-triggered vent. For example, during a crush or a projectile penetration event, the cell housing may fracture and thus allow the pressurized liquefied gas electrolyte to vent from the cell to atmosphere through the fractured housing while maintaining a cell temperature close to a room temperature of about 293.15K. When a conventional liquid electrolyte is used in the cell, there is a high probability that the cell can short-circuit during a crush or a projectile-penetration event and thus overheat, causing the cell to go into thermal runaway. With the liquefied gas electrolyte (including those that have a vapor pressure over 100 kPa at a room temperature of about 293.15K), the venting or gassing off of the electrolyte to the atmosphere through a fractured cell housing allows the cell to fail safely, regardless of a potential short-circuit event.

In all scenarios, it is highly desirable to have rapid venting of all the liquefied gas electrolyte from the cell under a physical, thermal or electrical abuse condition to minimize the likelihood of any thermal runaway event. To lower the time that it takes for the liquefied gas electrolyte to vent from the cell, a higher vapor pressure electrolyte is desirable. Too low of a vapor pressure electrolyte, and the electrolyte may not vent from the cell rapidly enough to prevent thermal runaway or the electrolyte from reaching auto-ignition and causing a fire hazard. Further, upon venting, the cell may lower in temperature due to the heat of evaporation caused by the liquefied gas phase changing from a liquid to a gaseous state. If the cell drops in temperature sufficiently, it may lower the vapor pressure enough such that the venting of the electrolyte from the cell stops, potentially creating an additional hazard. Thus, it is desirable that the liquefied gas electrolyte have a vapor pressure sufficient to vent from the cell rapidly. This vapor pressure of the electrolyte can thus be around 100 kPa, or more desirably, a vapor pressure between 100 kPa and 100 MPa, or more desirably around 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 3, 4, 5, 6, 7, 8, 9, or 10 MPa at a room temperature of 293.15 K. The cell may vent the entire contents of the liquefied gas electrolyte containing any gaseous, liquid, or solid components, or just the liquefied gas solvent and liquid components, or just the liquefied gas solvent components, or any combination of partial components from the cell. Even a partial venting of the electrolyte can result in a cell failing safely under physical, thermal, or electrical abuse conditions.

There are benefits to both a reduced vapor pressure electrolyte and an increased vapor pressure electrolyte. A reduced vapor pressure liquefied gas electrolyte can lower mechanical housing requirements and allow for a lower mass, lower volume, and lower cost cell. A higher vapor pressure liquefied gas electrolyte improves cell wettability during manufacturing, reducing manufacturing time, cost, and scrap rate as well as improving cell safety under physical, thermal or electrical abuse, such as during an over-temperature, over-charge, crush, nail penetration, or short-circuit event. Thus, it is through careful experimentation that a liquefied gas electrolyte may be optimized to have an ideal vapor pressure that is neither too high nor too low for optimized cell performance. This experimentation might start with a liquefied gas solvent, such as dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, difluoro ethylene, nitrous oxide, nitrogen dioxide, nitrogen oxide, carbon disulfide, hydrogen fluoride, hydrogen, isomers thereof, and combinations thereof, and with the addition of a hydrocarbon solvent to lower or increase the vapor pressure to optimize the cell performance. The addition of the hydrocarbon solvent may modify the liquefied gas electrolyte vapor pressure to achieve a vapor pressure of around 100 kPa, or more desirably, a vapor pressure between 100 kPa and 100 MPa, or more desirably around 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 3, 4, 5, 6, 7, 8, 9, or 10 MPa at a room temperature of 293.15 K. This might equate to a vapor pressure increase or decrease of 0.1% to 99.9% at any temperature from 1 K to 1000 K of the liquefied gas electrolyte. More desirably, the increase or decrease of the liquefied electrolyte vapor pressure might be around 0.1, 1, 5, 10, 15, 20, 25, 30, 35, 40, 45, 50, 55, 59, 60, 61, 65, 70, 75, 80, 90, 95, 99, or 99.9% at a room temperature of 293.15 K.

Hydrocarbons are an ideal material to use, since they impart improved chemical stability to the electrolyte and are relatively cheap. However, it is noted that addition of any hydrocarbon to the liquefied gas electrolyte will always impart some degree of flammability to the liquefied gas electrolyte system. This often leads to a less desirable lower flash point (the lowest temperature at which a material's vapor may ignite) of the electrolyte due to the generally low flash point of hydrocarbons. Even with the lower flash point brought about by the addition of these hydrocarbons to the liquefied gas electrolyte, the improved characteristics, such as improved safety, manufacturability, performance, lower GWP, etc., discussed above impart highly desirable aspects.

The mass ratio of the hydrocarbon solvent to the liquefied gas electrolyte solvent may be anywhere from 0.01 part in a hundred to 99.99 parts in a hundred by mass or by molar ratio when compared to the rest of the electrolyte. It is only through considerable experimentation the ratio of solvent, hydrocarbon co-solvent, salt, and one or more additives can be found in order to enhance solubility, minimize phase separation, maximize conductivity, and maximize cell performance. The addition of the hydrocarbon solvent may also benefit the electrolyte via lowering the vapor pressure or lowering the GWP while maintaining the same cell performance as an electrolyte without the addition of a hydrocarbon solvent.

Adding a non-polar solvent, such as a hydrocarbon, into an electrolyte can lower the overall solubility of the electrolyte. Several studies were conducted to determine which hydrocarbons and in what percent can be added to an electrolyte to optimize salt solubility. Other parameters, such as phase separation (where there is clear separation in high-density and low-density regions in the fluid), vapor pressure, and GWP are recorded in Table 1. Stainless-steel cells with glass windows were assembled containing various electrolytes, allowing for the study of salt solubility in various electrolyte formulations. Table 1 below presents the observed solubility for various electrolyte formulations at 293.15K. As expected, due to the non-polar nature of hydrocarbon solvents, lithium salts have difficulty solubilizing even with enhancing additives. However, when used as a co-solvent in a mixture containing fluoromethane, difluoromethane, or both fluoromethane and difluoromethane, salt solubility is enhanced. It has previously been noted that phase separation can occur in various combinations of liquefied gas electrolytes indicative of poor miscibility of the salt, additive, and solvent system. These solubility experiments highlight that carful control of the salt solvation structure is key to creating an electrolyte mixture with high salt solubility and no phase separation. In doing so, the ratio of hydrocarbon solvent can be tuned and demonstrated from 0.01 to 99.99 percent of the solvent mixture. Table 1 uses 1M of salt as standard for purposes of a fixed salt concentration; however, higher or lower concentrations have been carefully explored, and salt solubilities from 0.001 to 5M have been observed with varying results. However, it was noted that under no concentration of salt was salt seen to be soluble in any solvent comprised of only one or more hydrocarbon solvents. Further, with mixtures of a solvent comprised of only one or more hydrocarbon-based solvents and liquid additives to improve salt solubility, it was consistently observed that there was no salt solubility, or there was strong phase separation. Further, with mixtures of a solvent comprised of only one or more hydrocarbon-based solvents and salt and with or without liquid additives to improve salt solubility, it was consistently observed there was no lowering of the vapor pressure relative to the vapor pressure of the pure solvent comprised of only one or more hydrocarbon solvent.

TABLE 1

| Salt Concentration | Salt | Additive Concentration | Additive | Solvent Mixture (Molar Ratio) | Solubility | Pressure at 293.15 K (psi) | GWP (CO2 eq./kg) |
|---|---|---|---|---|---|---|---|
| 1.0M | LiTFSI | 1.0M | Trimethyl phosphate | Fluoromethane (100) | Soluble, No Phase Separation | 531 | 105 |
| 1.0M | LiTFSI | 1.0M | Triethylene glycol dimethyl ether | Difluoromethane (100) | Soluble, No Phase Separation | 223 | 677 |
| 1.0M | LiTFSI | — | — | Iso-Butane (100) | Not Soluble | 45 | <10 |
| 1.0M | LiTFSI | — | — | Methane (100) | Not Soluble | 1000 | <10 |
| 1.0M | LiTFSI | — | — | Ethane (100) | Not Soluble | 540 | <10 |
| 1.0M | LiTFSI | — | — | Propane (100) | Not Soluble | 122 | <10 |
| 1.0M | LiTFSI | — | — | n-Butane (100) | Not Soluble | 16 | <10 |
| 1.0M | LiTFSI | — | — | Ethene | Not Soluble | 1000 | <10 |
| 1.0M | LiTFSI | — | — | Propene | Not Soluble | 145 | <10 |
| 1.0M | LiTFSI | — | — | Acetylene | Not Soluble | 635 | <10 |
| 1.0M | LiPF6 | — | — | Iso-Butane (100) | Not Soluble | 45 | <10 |
| 1.0M | LiPF6 | — | — | Methane (100) | Not Soluble | 1000 | <10 |
| 1.0M | LiPF6 | — | — | Ethane (100) | Not Soluble | 540 | <10 |
| 1.0M | LiPF6 | — | — | Propane (100) | Not Soluble | 122 | <10 |
| 1.0M | LiPF6 | — | — | n-Butane (100) | Not Soluble | 16 | <10 |
| 1.0M | LiPF6 | — | — | Ethene | Not Soluble | 1000 | <10 |
| 1.0M | LiPF6 | — | — | Propene | Not Soluble | 145 | <10 |
| 1.0M | LiPF6 | — | — | Acetylene | Not Soluble | 635 | <10 |
| 1.0M | LiTFSI | 1.0M | Trimethyl phosphate | Iso-Butane (100) | Not Soluble | 45 | 3 |
| 1.0M | LiTFSI | 2.0M | Trimethyl phosphate | Iso-Butane (100) | Not Soluble | 45 | 3 |
| 1.0M | LiTFSI | 2.0M | Trimethyl phosphate | Fluoromethane:Iso-Butane:Carbon Dioxide (80:10:10) | Soluble, No Phase Separation | 486 | 93 |
| 1.0M | LiTFSI | 2.0M | Trimethyl phosphate | Fluoromethane:n-Butane:Carbon Dioxide (70:20:10) | Soluble, Phase Separation | 438 | 82 |
| 1.0M | LiTFSI | 2.0M | Trimethyl phosphate | Difluoromethane:n-Butane:Carbon Dioxide (70:20:10) | Soluble, No Phase Separation | 246 | 475 |
| 1.0M | LiTFSI | 2.0M | Sulfolane | Fluoromethane:Propane:Carbon Dioxide (60:30:10) | Soluble, Phase Separation | 419 | 71 |
| 1.0M | LiTFSI | 2.0M | Ethylene carbonate | Fluoromethane:Propane:Carbon Dioxide (60:30:10) | Soluble, Phase Separation | 419 | 71 |
| 1.0M | LiTFSI | 2.0M | Dimethyl carbonate | Fluoromethane:Propane:Carbon Dioxide (60:30:10) | Soluble, Phase Separation | 419 | 71 |
| 1.0M | LiTFSI | 2.0M | Triethylene glycol dimethyl ether | Fluoromethane:Propane:Carbon Dioxide (60:30:10) | Soluble, Phase Separation | 419 | 71 |
| 1.0M | LiTFSI | 2.0M | Triethyl phosphate | Fluoromethane:Propane:Carbon Dioxide (60:30:10) | Soluble, No Phase Separation | 419 | 71 |
| 1.0M | LiTFSI | 2.0M | Triethyl phosphate | Fluoromethane:Propane:Carbon Dioxide (40:50:10) | Soluble, No Phase Separation | 345 | 48 |
| 1.0M | LiTFSI | 2.0M | Triethyl phosphate | Fluoromethane:Propene:Carbon Dioxide (40:50:10) | Soluble, No Phase Separation | 358 | 47 |
| 1.0M | LiTFSI | 2.0M | Triethyl phosphate | Difluoromethane:Propane:Carbon Dioxide (35:60:5) | Soluble, No Phase Separation | 195 | 238 |
| 1.0M | LiTFSI | 2.0M | Triethyl phosphate | Difluoromethane:Propene:Carbon Dioxide (35:60:5) | Soluble, No Phase Separation | 211 | 237 |
| 1.0M | LiTFSI | 2.0M | Triethyl phosphate | Fluoromethane:Propene:Carbon Dioxide (20:70:10) | Soluble, No Phase Separation | 288 | 23 |
| 1.0M | LiTFSI | 2.0M | Triethyl phosphate | Difluoromethane:Propene:Carbon Dioxide (5:90:5) | Soluble, No Phase Separation | 188 | 34 |

Because of the high reactivity of lithium metal, lithium metal is difficult to use as an anode in high energy lithium battery cells. To demonstrate the advantage of including chemically inert co-solvents such as hydrocarbon solvents, Li metal was stored in various solvent and electrolyte mixtures for 24 hours and visually inspected for deleterious side reactions. Similar to liquid hydrocarbon analogues (i.e. hexane), lithium metal can be stored in liquefied-gas hydrocarbon solvents and liquefied gas-based electrolytes including hydrocarbons as a co-solvent without any deleterious side reactions. Observations of lithium metal after soaking in various solvents and electrolytes at 293.15K for 24 hours is shown in Table 2.

TABLE 2

| Salt Concentration | Salt | Additive Concentration | Additive | Solvent Mixture (Molar Ratio) | Li Metal Observation After Soaking |
|---|---|---|---|---|---|
| — | — | — | — | Fluoromethane (100) | Surface Reaction |
| — | — | — | — | Hexane | No Reaction |
| — | — | — | — | Propane | No Reaction |
| — | — | — | — | Propene | No Reaction |
| 1.0M | LiTFSI | 2.0M | Trimethyl phosphate | Difluoromethane:Fluoromethane:Propane:Carbon Dioxide (10:65:10:15) | No Reaction |
| 1.0M | LiTFSI | 2.0M | Triethyl phosphate | Fluoromethane:Propane:Carbon Dioxide (80:10:10) | No Reaction |
| 1.0M | LiTFSI | 2.0M | Triethyl phosphate | Fluoromethane:Propane:Carbon Dioxide (40:50:10) | No Reaction |

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as: graphite, carbon, activated carbon, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride or of a metallic electrode with lithium, sodium, magnesium, tin, aluminum, zinc metal or metal alloy including lithium, sodium, tin, magnesium, aluminum, zinc, or any combination thereof. These components may be combined with various binder polymer components, including polyvinylidene fluoride, carboxymethyl cellulose, styrene-butadiene rubber, or polytetrafluoroethylene, to maintain structural integrity of the electrode.

Further, the one or more liquefied gas solvent solution or electrolyte may be combined with one or more salts, including one or more of: lithium bis(trifluoromethanesulfonyl) imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato)borate (LiBOB), lithium hexafluorostannate, lithium difluoro(oxalato)borate (LiDFOB), lithium bis(fluorosulfonyl)imide (LiFSI), lithium aluminum fluoride (LiAlF3), lithium nitrate (LiNO3), lithium chloroaluminate, lithium tetrafluoroborate (LiBF4), lithium tetrachloroaluminate, lithium difluorophosphate, lithium tetrafluoro(oxalato)phosphate, lithium difluorobis(oxalato)phosphate, lithium borate, lithium oxolate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium di-ketosuccinate or any corresponding salts with the positive charged lithium cation substituted for sodium or magnesium or any combinations thereof. Further useful salts include those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium, N,N-diythyl-N-methyl-N(2methoxyethyl) ammonium, N,N-Diethyl-N-methyl-N-propylammonium, N,N-dimethyl-N-ethyl-N-(3-methoxypropyl)ammonium, N,N-Dimethyl-N-ethyl-N-benzylammonium, N,N-Dimethyl-N-ethyl-N-phenylethylammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalate)borate, bis(trifluoromethanesulfonyl) imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate.

Example 1

Figure 2:
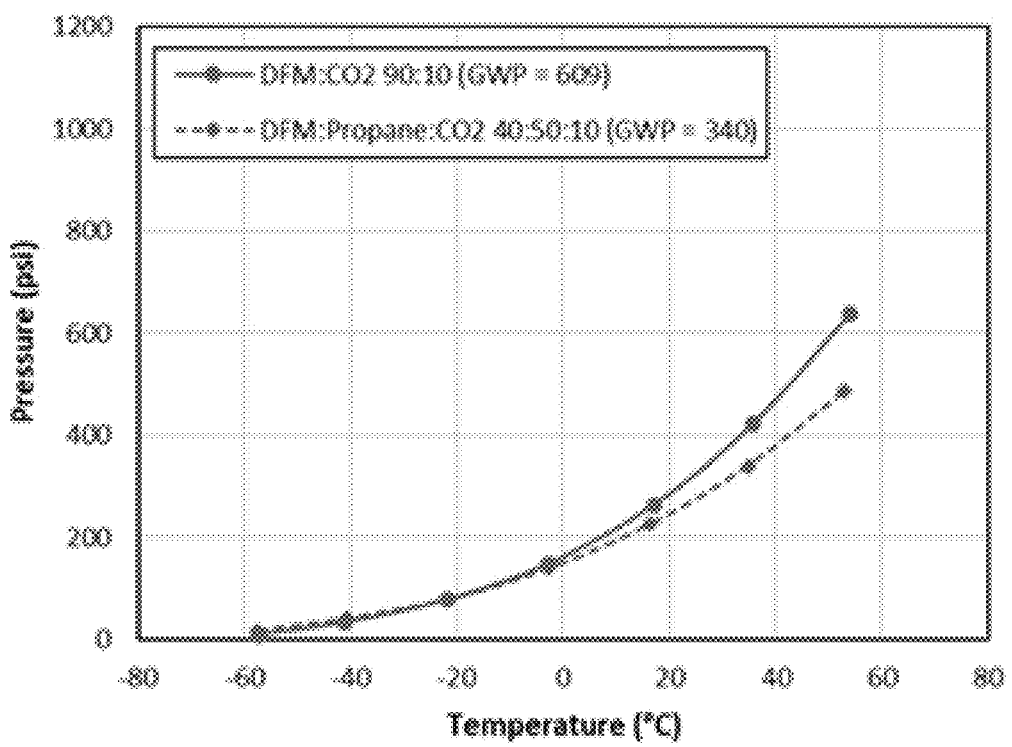
FIG. 2 compares the pressure of various liquefied gas electrolytes; Electrolyte 1: 1.0M LiTFSI and 2.0M trimethyl phosphate in 90 parts by mole difluoromethane and 10 parts by mole carbon dioxide (solid line); Electrolyte 2: 1.0M LiTFSI and 2.0M triethyl phosphate in 40 parts by mole difluoromethane, 50 parts by mole propane, and 10 part by mole carbon dioxide (dashed line).

Replacing a portion of fluoromethane in a battery cell with a hydrocarbon co-solvent, such as propane, would have a beneficial effect on the cell such as having lower vapor pressure and GWP, as shown in FIG. 1 (fluoromethane) and FIG. 2 (difluoromethane). Pressure measurements were conducted on various electrolyte formulations. The electrolyte with the hydrocarbon solvent (propane) is shown to have a lower vapor pressure and lower GWP compared to the fluoromethane without the hydrocarbon co-solvent. Specifically, the GWP of the electrolyte mixture was reduced by 54% compared to fluoromethane without the hydrocarbon co-solvent. Also, the vapor pressure of the electrolyte mixture was reduced by 40% (at 293.15K) and by 45% (at 313.15K) compared to fluoromethane without the hydrocarbon co-solvent. This is shown in FIG. 1. Similarly, the GWP of the electrolyte mixture was reduced by 44% compared to difluoromethane without the hydrocarbon co-solvent. Also, the vapor pressure of the electrolyte mixture was reduced by 15% (at 293.15K) and by 28% (at 313.15K) compared to difluoromethane without the hydrocarbon co-solvent. This is shown in FIG. 2.

GWP is measured as $CO_2$ equivalents per mass ($CO_2$ eq/kg). Addition of one or more hydrocarbon solvents with low or zero GWP to the first electrolyte mixture with a higher GWP will lower the overall GWP of the final mixture by dilution of the GWP over a larger mass of the final electrolyte. The lower GWP effect can be fine-tuned by adjusting the quantity of hydrocarbon co-solvent or by changing the type of hydrocarbon co-solvent used. Other hydrocarbon co-solvents that may be used include: methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, and a combination thereof. Preferably, the quantity and type of hydrocarbon solvent used lowers the GWP of the mixture (i.e. solvent plus co-solvent) by at least 10% compared to the GWP of the solvent without the hydrocarbon co-solvent.

The improvement in lowering the vapor pressure increases across the operational temperature range of the electrochemical energy storage device, which significantly reduces the pressure requirement for the cell housing. Thicker cell walls are less desirable because they add volume, mass, and cost to the cell. Alternatively, stronger metals might be used with thinner walls, such as stainless steel and titanium, but at an added cost to the cell. Thus, lowering the vapor pressure of the electrolyte across the operational temperatures, as shown in FIGS. 1 and 2, will have beneficial properties.

Example 2

Figure 3:
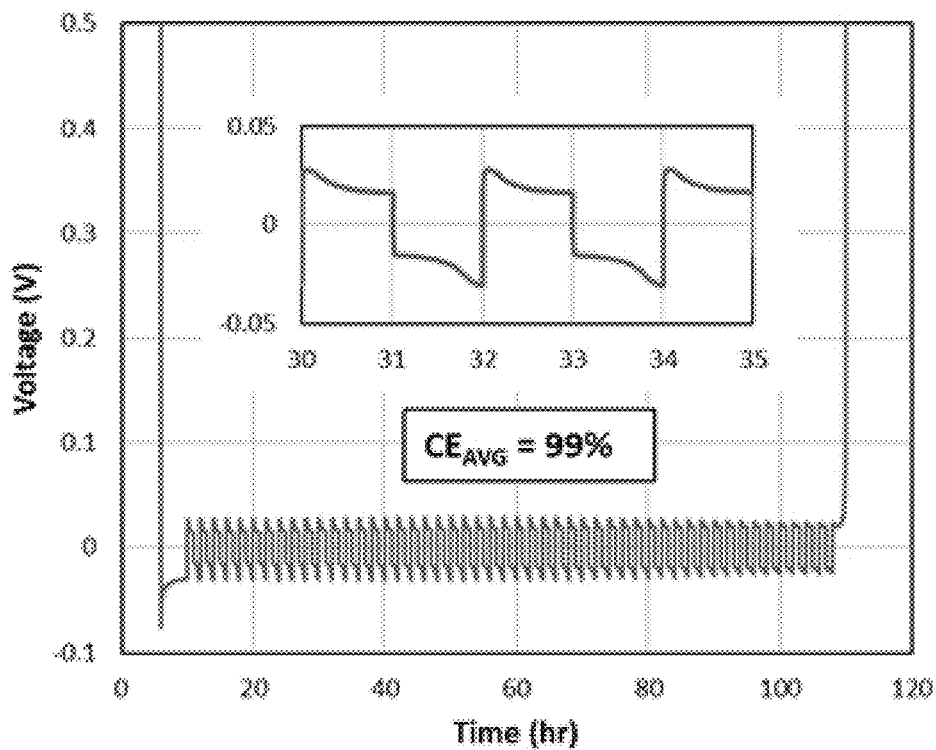
FIG. 3 illustrates the performance of a battery coin cell using a lithium metal anode, a stainless-steel counter cathode, and an electrolyte composed of 1.0M LiTFSI and 2.0M trimethyl phosphate in 75 parts by mole fluoromethane, 15 parts by mole propane, and 10 parts by mole carbon dioxide.
Figure 4:
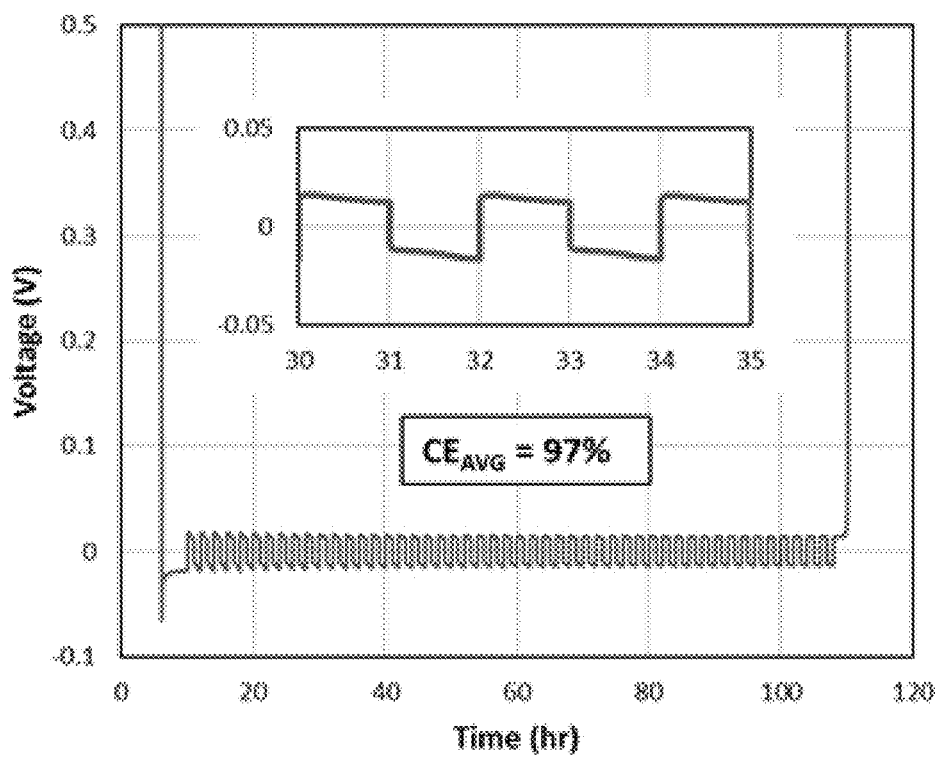
FIG. 4 illustrates the performance of a battery coin cell using a lithium metal anode, a stainless-steel counter cathode, and an electrolyte composed of 1.0M LiTFSI and 2.0M trimethyl phosphate in 90 parts by mole fluoromethane, and 10 parts by mole carbon dioxide.

The use of propane instead of fluoromethane improves stability of lithium metal in the electrolyte solution, as shown in Table 2. This is further shown in lithium metal plating-stripping tests conducted to determine the relative stability of the electrolyte with lithium metal. A battery coin cell composed of a lithium metal anode and a stainless-steel counter-electrode were built and used to test lithium metal plating and stripping. The cell was used to plate 4.0 mAh/$cm^2$ lithium metal onto the stainless-steel working electrode at a current of 0.5 mA/$cm^2$. Subsequently 0.5 mAh/$cm^2$ of lithium metal was stripped and plated at a current of 0.5 mA/$cm^2$ for 50 cycles. Finally, the remaining lithium metal was stripped to a high-voltage cutoff of 1.0V to determine the average lithium plating and stripping cycle efficiency. These test results are shown in FIG. 3 (with hydrocarbon solvent) and FIG. 4 (without hydrocarbon solvent), showing that the addition of the hydrocarbon solvent improves the coulombic efficiency (CE) of the cell. Minimal growth in overpotential and ~99% coulombic efficiency is demonstrated in FIG. 3, as opposed to FIG. 4, which shows a lowered coulombic efficiency of 97% when not using a hydrocarbon component in the electrolyte. This is indicative of minimal dendritic growth and of favorable solid electrolyte interphase passivation products via lowering the electrolyte reactivity with the lithium metal anode with the use of a hydrocarbon solvent.

Example 3

Figure 5:
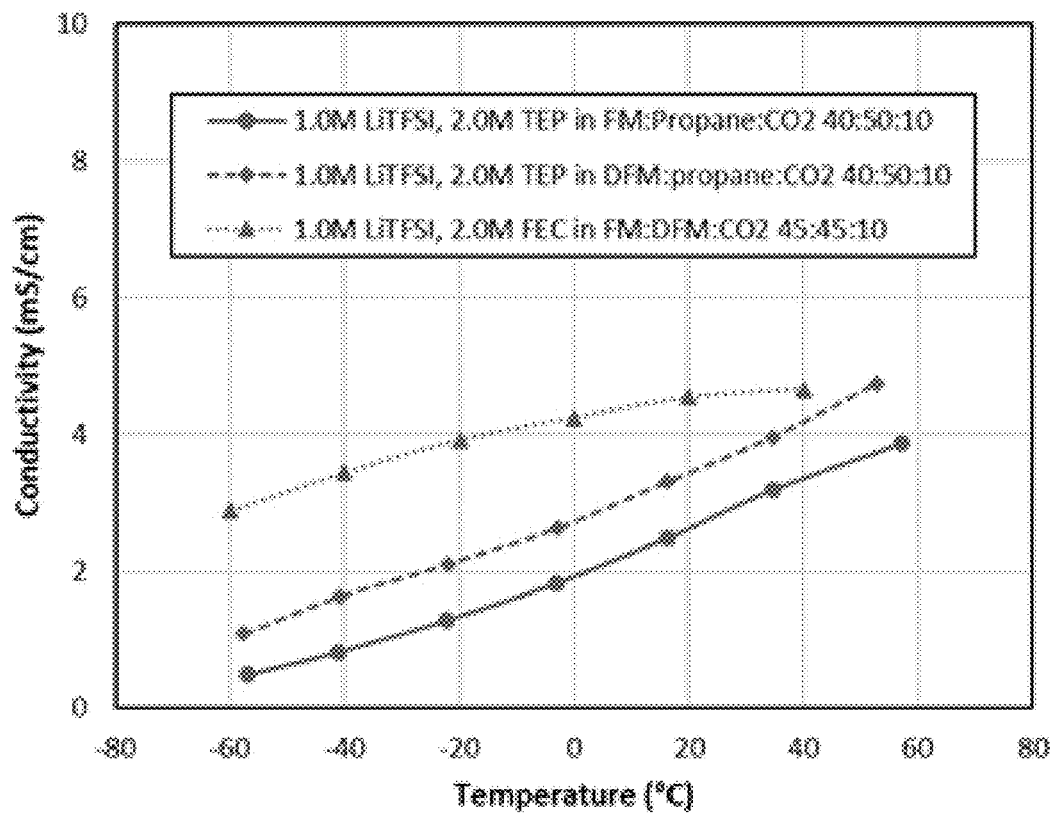
FIG. 5 illustrates the electrolytic conductivity of various liquefied gas electrolytes; Electrolyte 1: 1.0M LiTFSI and 2.0M triethyl phosphate in 40 parts by mole fluoromethane, 50 parts by mole propane, and 10 parts by mole carbon dioxide; Electrolyte 2: 1.0M LiTFSI and 2.0M triethyl phosphate in 40 parts by mole difluoromethane, 50 parts by mole propane, and 10 parts by mole carbon dioxide; Electrolyte 3: 1.0M LiTFSI and 2.0M fluoroethylene carbonate in 45 parts by mole difluoromethane, 45 parts by mole fluoromethane, and 10 parts by mole carbon dioxide.

Electrolytic conductivity measurements were conducted on various electrolytes with and without hydrocarbon solvents. The electrolyte solutions containing hydrocarbon co-solvents demonstrate similar electrolytic conductivity to the fluoromethane- and difluoromethane-dominant electrolyte, as shown in FIG. 5. Slightly lower conductivity with a hydrocarbon solvent would still be acceptable for a functional device, particularly one with a lower pressure and a lower GWP.

Example 4

Figure 6:
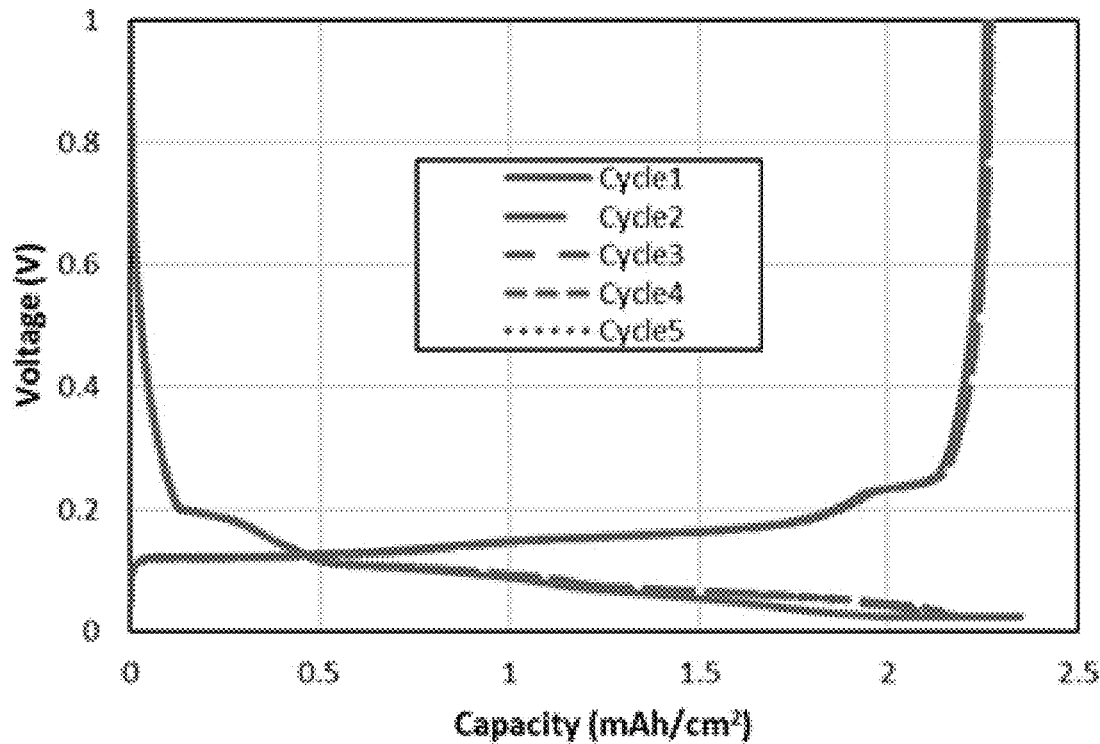
FIG. 6 illustrates the performance of a battery coin cell using a lithium metal anode, a graphite cathode, and an electrolyte composed of 1.0M LiTFSI and 2.0M trimethyl phosphate in 40 parts by mole fluoromethane, 50 parts by mole propane, and 10 parts by mole carbon dioxide.
Figure 7:
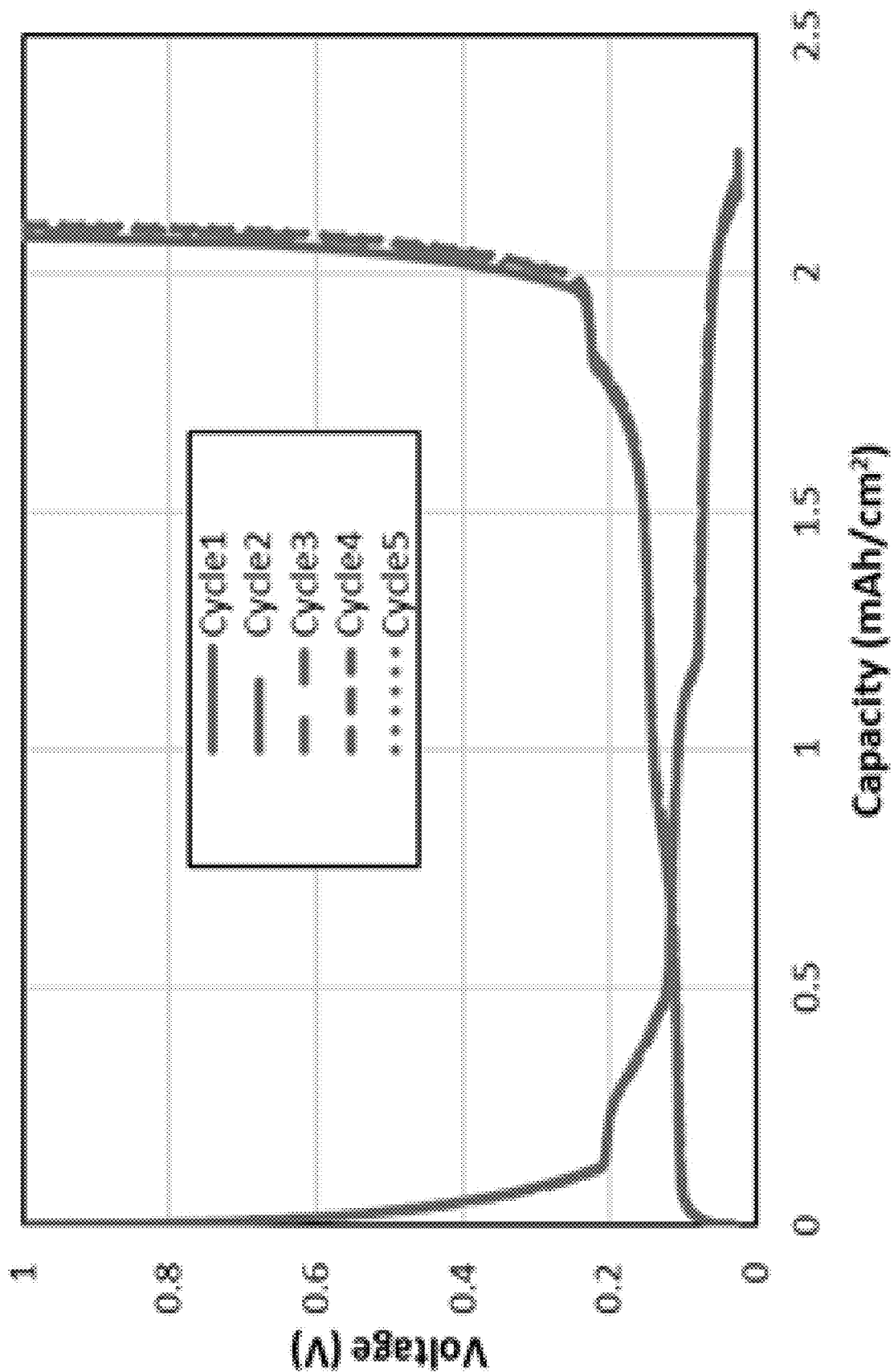
FIG. 7 illustrates the performance of a battery coin cell using a lithium metal anode, a graphite cathode, and an electrolyte composed of 1.0M LiTFSI and 1.0M trimethyl phosphate in 45 parts by mole difluoromethane, 45 parts by mole fluoromethane, and 10 parts by mole carbon dioxide.

A battery coin cell composed of a lithium metal anode, a graphite cathode, and varying electrolytes is compared in FIG. 6 and FIG. 7. The cells were cycled at a C/10 rate for 5 cycles, showing the electrolyte's ability to form a stable solid electrolyte interphase with the graphite anode. FIG. 6 shows performance for a cell made with a hydrocarbon-based electrolyte, while FIG. 7 shows performance for a cell made with an electrolyte with no hydrocarbon solvent. This shows that the addition of the hydrocarbon solvent can lower the vapor pressure and the GWP of the electrolyte without sacrificing cell performance.

Example 5

Figure 8:
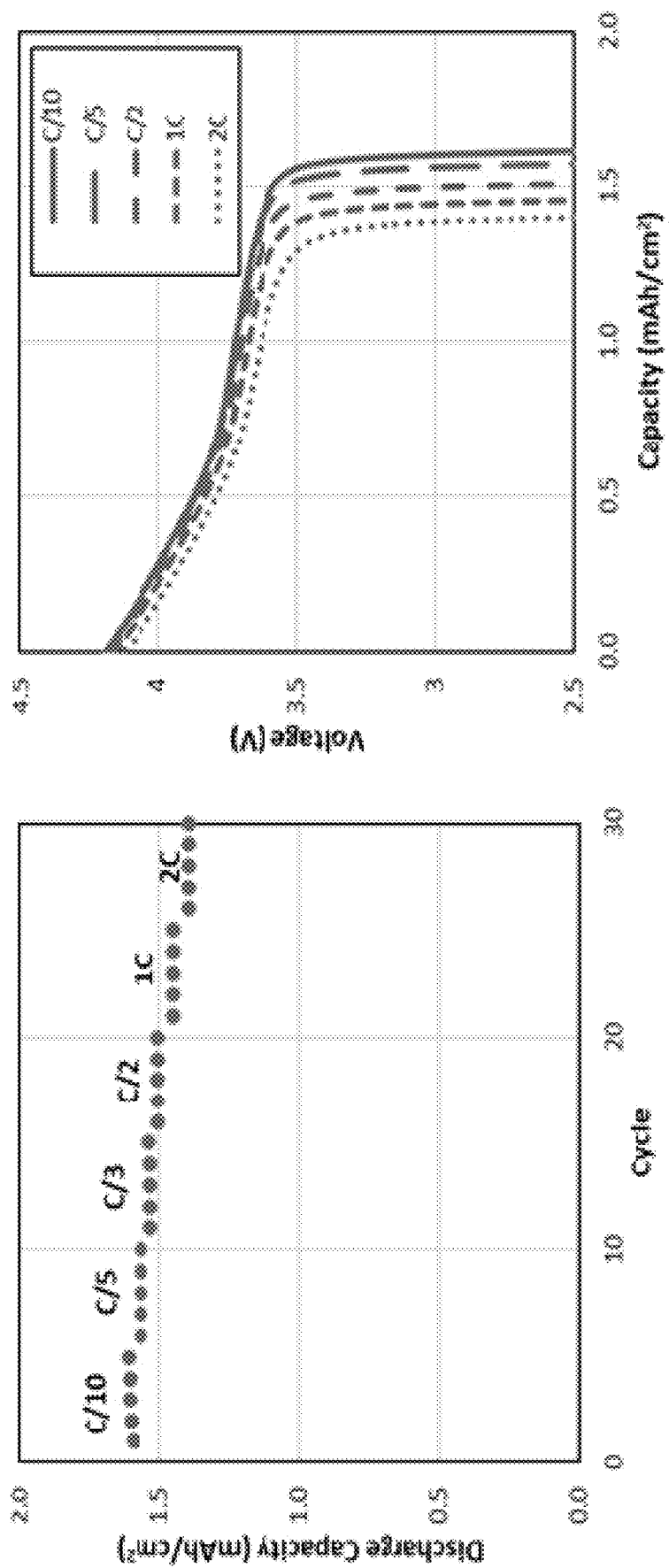
FIG. 8 illustrates the performance of a battery coin cell using a lithium metal anode, a lithium-nickel-manganese oxide (NMC622) cathode, and an electrolyte composed of 1.0M LiTFSI and 2.0M trimethyl phosphate in 90 parts by mole fluoromethane, and 10 parts by mole carbon dioxide.

A battery coin cell using a lithium metal anode, a lithium-nickel-manganese oxide (NMC622) cathode, and an electrolyte composed of 1.0M LiTFSI and 2.0M trimethyl phosphate in 90 parts by mole fluoromethane, and 10 parts by mole carbon dioxide was constructed. Performance is shown in FIG. 8. This electrolyte contains no hydrocarbon solvent.

Example 6

Figure 9:
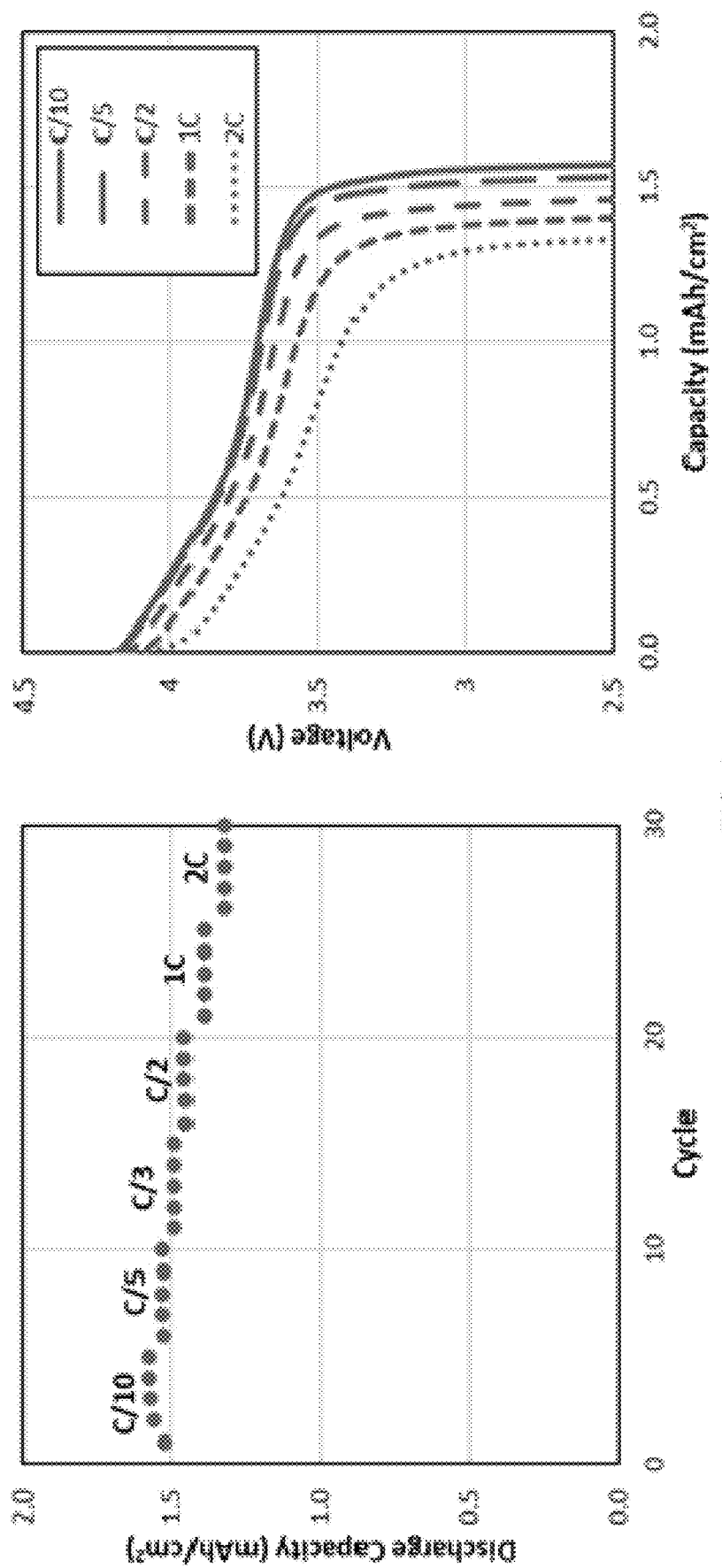
FIG. 9 illustrates the performance of a battery coin cell using a lithium metal anode, a lithium-nickel-manganese oxide (NMC622) cathode, and an electrolyte composed of 1.0M LiTFSI and 2.0M trimethyl phosphate in 80 parts by mole fluoromethane, 10 parts by mole iso-butane, and 10 parts by mole carbon dioxide.

A battery coin cell is composed of a lithium metal anode, a lithium-nickel-manganese oxide (NMC622) cathode, and an electrolyte composed of 1.0M LiTFSI and 2.0M trimethyl phosphate in 80 parts by mole fluoromethane, 10 parts by mole iso-butane, and 10 parts by mole carbon dioxide. This electrolyte solution has a GWP of 93 and pressure of 486 psi at 293.15K. The cell was cycled to 4.2V at various rates of C/10, C/5, C/3, C/2, 1C, and 2C rate for 5 cycles at each rate. Cell performance is shown in FIG. 9. This cell shows similar performance compared to the similar cell with no hydrocarbon solvent in FIG. 8.

Example 7

Figure 10:
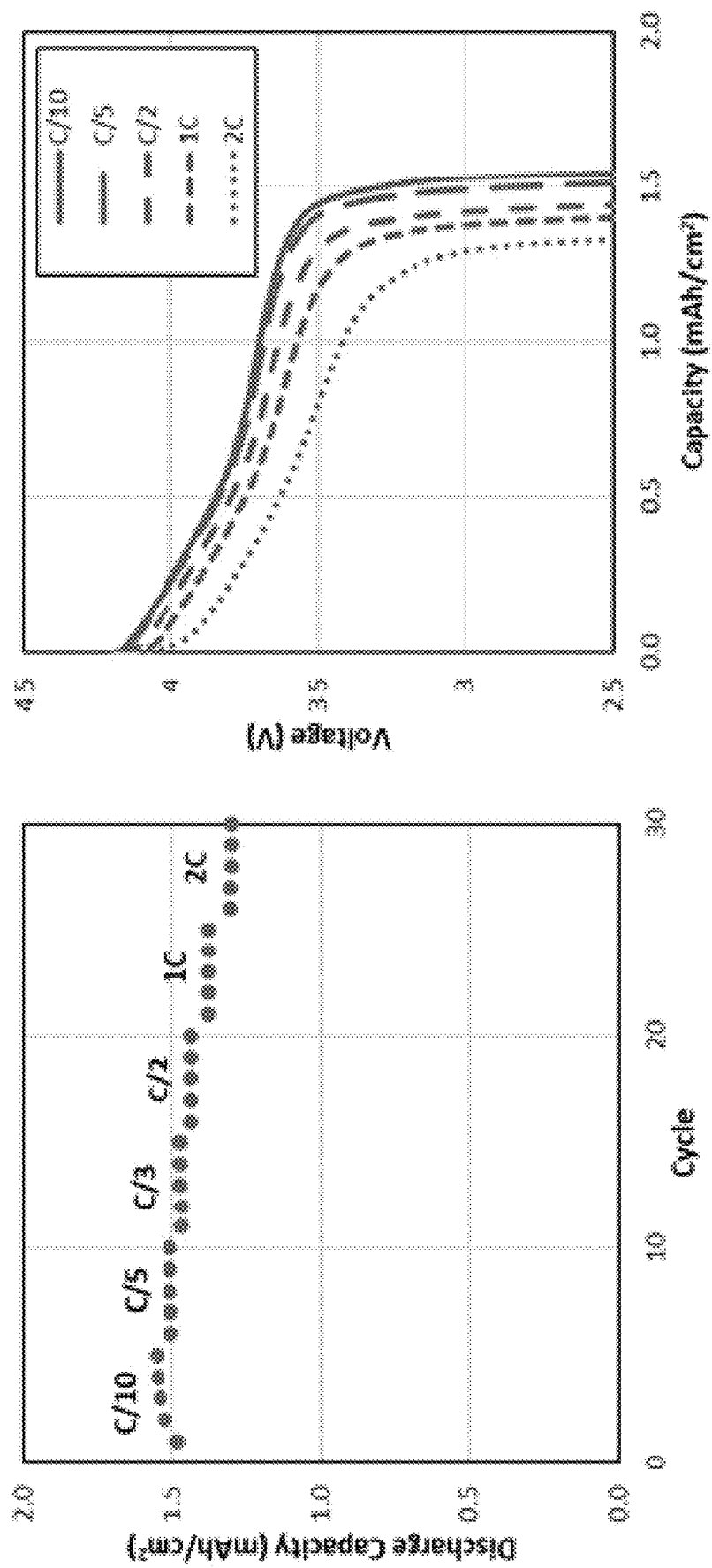
FIG. 10 illustrates the performance of a battery coin cell using a lithium metal anode, a lithium-nickel-manganese oxide (NMC622) cathode, and an electrolyte composed of 1.0M LiTFSI and 2.0M trimethyl phosphate in 80 parts by mole fluoromethane, 10 parts by mole n-butane, and 10 parts by mole carbon dioxide.

A battery coin cell is composed of a lithium metal anode, a lithium-nickel-manganese oxide (NMC622) cathode, and an electrolyte composed of 1.0M LiTFSI and 2.0M trimethyl phosphate in 80 parts by mole fluoromethane, 10 parts by mole n-butane, and 10 parts by mole carbon dioxide. This electrolyte solution has a GWP of 93 and pressure of 484 psi at 293.15K. The cell was cycled to 4.2V at various rates of C/10, C/5, C/3, C/2, 1C, and 2C rate for 5 cycles at each rate. Cell performance is shown in FIG. 10. This cell shows similar performance compared to the similar cell with no hydrocarbon solvent in FIG. 8.

Example 8

Figure 11:
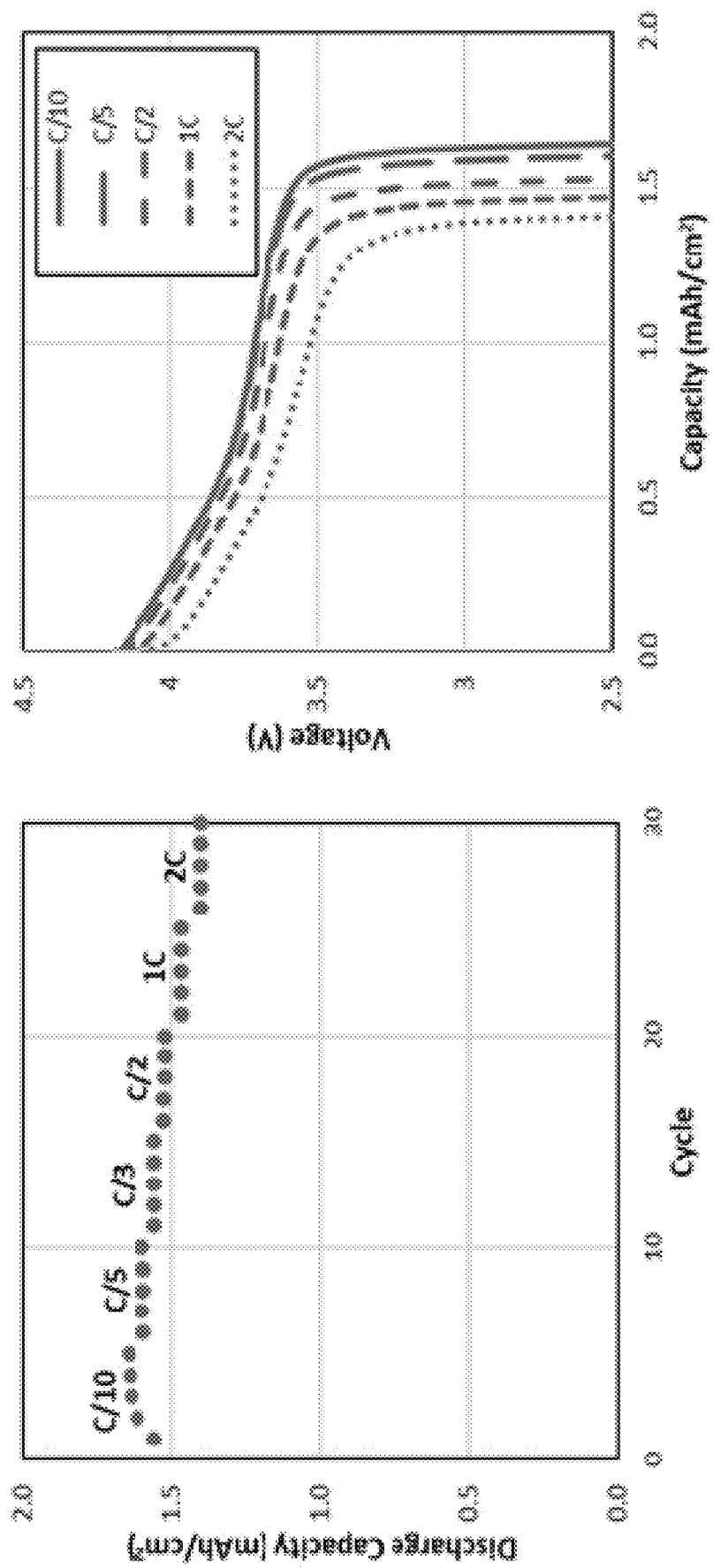
FIG. 11 illustrates the performance of a battery coin cell using a lithium metal anode, a lithium-nickel-manganese oxide (NMC622) cathode, and an electrolyte composed of 1.0M LiTFSI and 2.0M trimethyl phosphate in 70 parts by mole difluoromethane, 20 parts by mole n-butane, and 10 parts by mole carbon dioxide.

A battery coin cell is composed of a lithium metal anode, a lithium-nickel-manganese oxide (NMC622) cathode, and an electrolyte composed of 1.0M LiTFSI and 2.0M trimethyl phosphate in 70 parts by mole difluoromethane, 20 parts by mole n-butane, and 10 parts by mole carbon dioxide. This electrolyte solution has a GWP of 475 and pressure of 246 psi at 293.15K. The cell was cycled to 4.2V at various rates of C/10, C/5, C/3, C/2, 1C, and 2C rate for 5 cycles at each rate. Cell performance is shown in FIG. 11. This cell shows similar performance compared to the similar cell with no hydrocarbon solvent in FIG. 8.

Example 9

Figure 12:
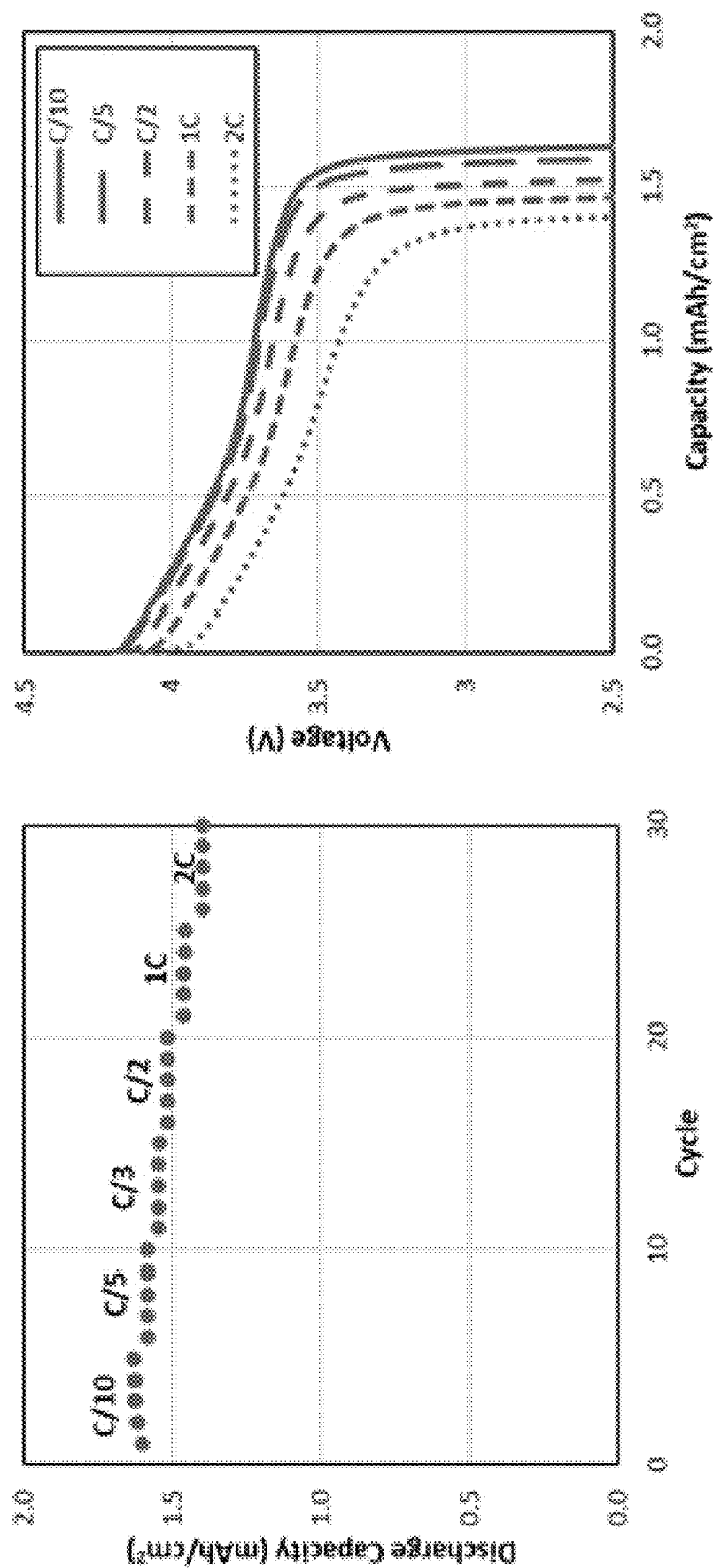
FIG. 12 illustrates the performance of a battery coin cell using a lithium metal anode, a lithium-nickel-manganese oxide (NMC622) cathode, and an electrolyte composed of 1.0M LiTFSI and 2.0M triethyl phosphate in 40 parts by mole fluoromethane, 50 parts by mole propane, and 10 parts by mole carbon dioxide.

A battery coin cell is composed of a lithium metal anode, a lithium-nickel-manganese oxide (NMC622) cathode, and an electrolyte composed of 1.0M LiTFSI and 2.0M triethyl phosphate in 40 parts by mole fluoromethane, 50 parts by mole propane, and 10 parts by mole carbon dioxide. This electrolyte solution has a GWP of 48 and pressure of 345 psi at 293.15K. The cell was cycled to 4.2V at various rates of C/10, C/5, C/3, C/2, 1C, and 2C rate for 5 cycles at each rate. Cell performance is shown in FIG. 12. This cell shows similar performance compared to the similar cell with no hydrocarbon solvent in FIG. 8.

Example 10

Figure 13:
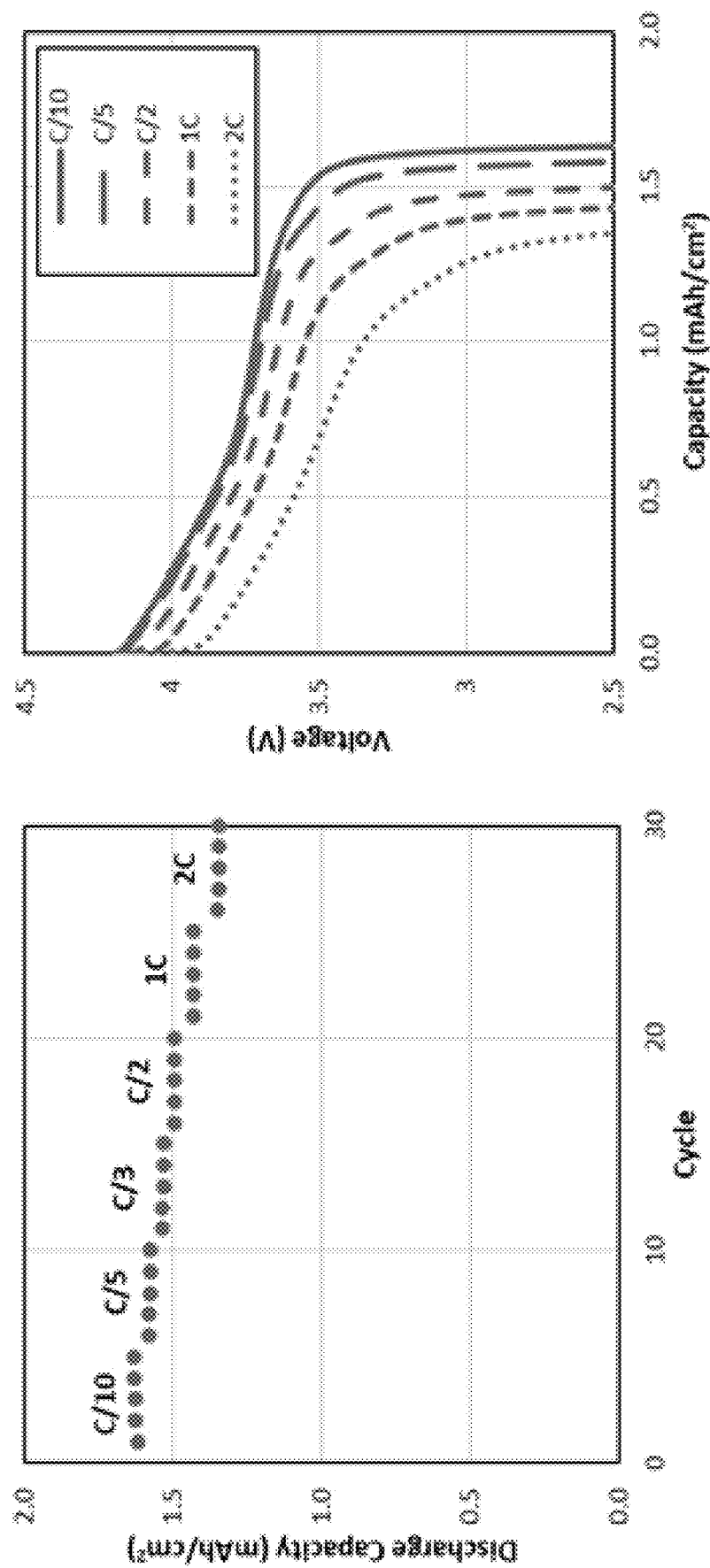
FIG. 13 illustrates the performance of a battery coin cell using a lithium metal anode, a lithium-nickel-manganese oxide (NMC622) cathode, and an electrolyte composed of 1.0M LiTFSI and 2.0M triethyl phosphate in 40 parts by mole fluoromethane, 50 parts by mole propene, and 10 parts by mole carbon dioxide.

A battery coin cell is composed of a lithium metal anode, a lithium-nickel-manganese oxide (NMC622) cathode, and an electrolyte composed of 1.0M LiTFSI and 2.0M triethyl phosphate in 40 parts by mole fluoromethane, 50 parts by mole propene, and 10 parts by mole carbon dioxide. This electrolyte solution has a GWP of 47 and pressure of 357 psi at 293.15K. The cell was cycled to 4.2V at various rates of C/10, C/5, C/3, C/2, 1C, and 2C rate for 5 cycles at each rate. Cell performance is shown in FIG. 13. This cell shows similar performance compared to the similar cell with no hydrocarbon solvent in FIG. 8.

Example 11

Figure 14:
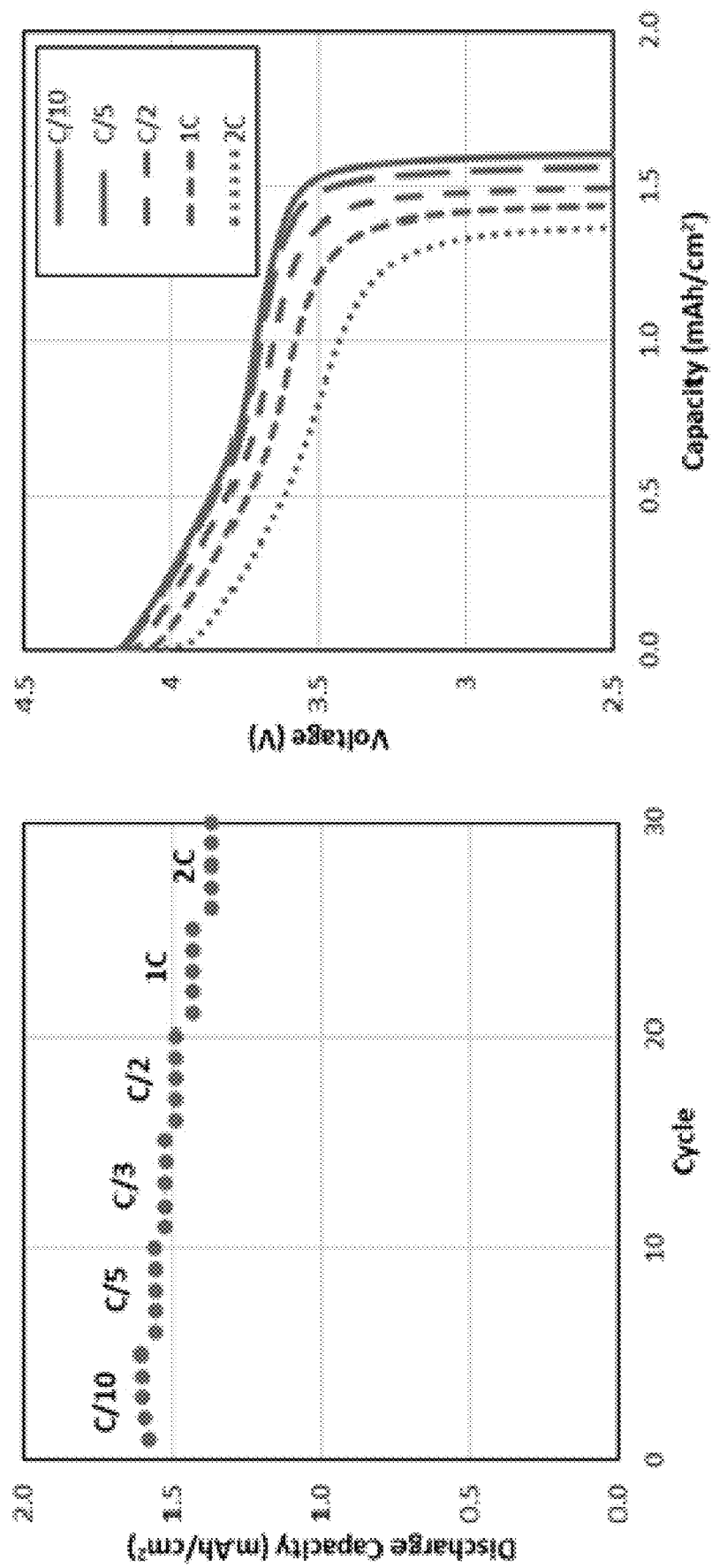
FIG. 14 illustrates the performance of a battery coin cell using a lithium metal anode, a lithium-nickel-manganese oxide (NMC622) cathode, and an electrolyte composed of 1.0M LiTFSI and 2.0M triethyl phosphate in 35 parts by mole difluoromethane, 60 parts by mole propane, and 5 parts by mole carbon dioxide.
Figure 15:
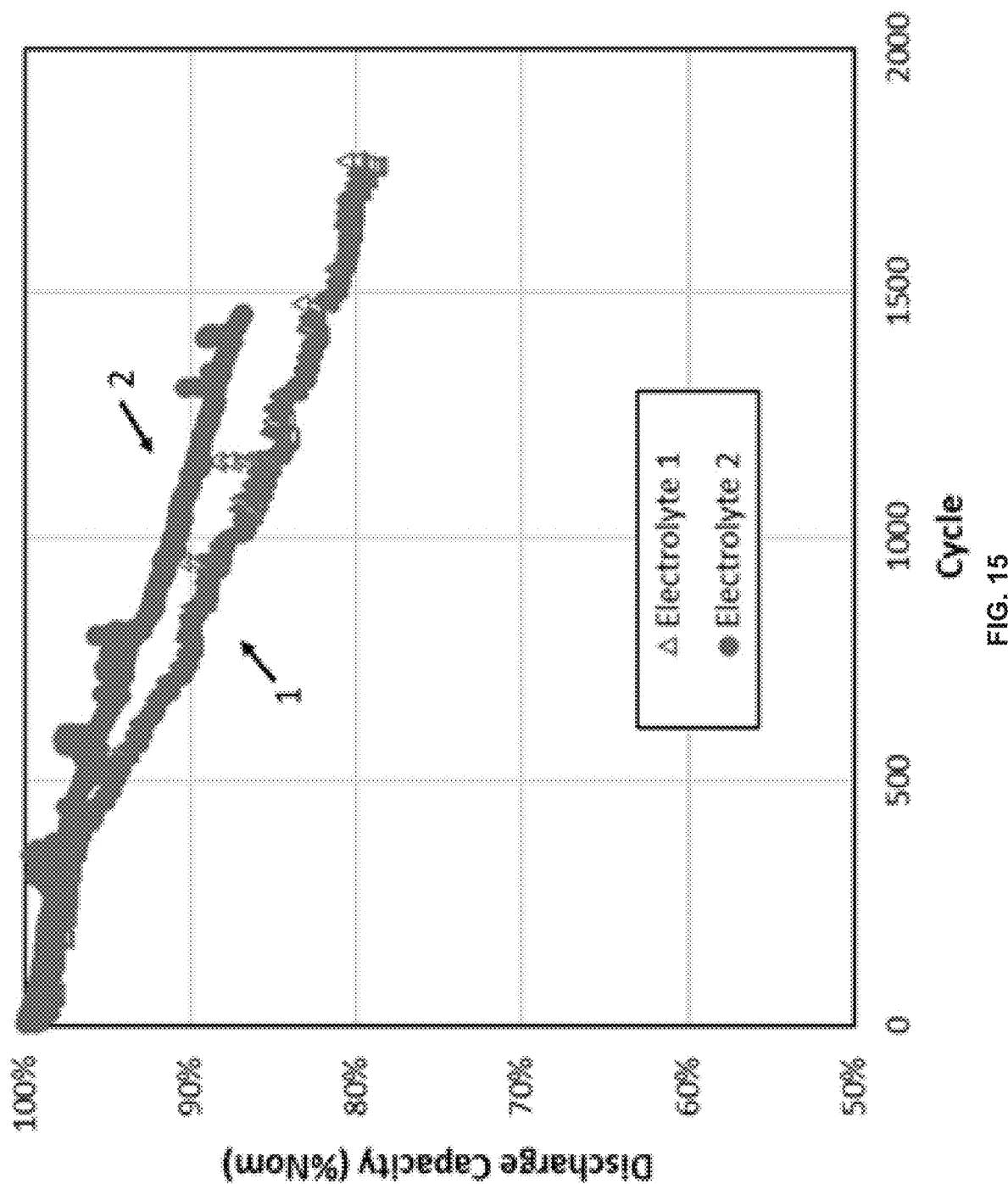
FIG. 15 illustrates the performance of two battery coin cells using a lithium metal anode, a lithium-nickel-manganese oxide (NMC622) cathode, and varying electrolytes; Electrolyte 1: 1.0M LiTFSI and 2.0M trimethyl phosphate (TMP) in 90 parts by mole fluoromethane, and 10 parts by mole carbon dioxide; Electrolyte 2: 1.0M LiTFSI and 2.0M triethyl phosphate in 35 parts by mole difluoromethane, 60 parts by mole propane, and 5 parts by mole carbon dioxide.

A battery coin cell is composed of a lithium metal anode, a lithium-nickel-manganese oxide (NMC622) cathode, and an electrolyte composed of 1.0M LiTFSI and 2.0M triethyl phosphate in 35 parts by mole difluoromethane, 60 parts by mole propane, and 5 parts by mole carbon dioxide. This electrolyte solution has a GWP of 239 and pressure of 195 psi at 293.15K. The cell was cycled to 4.2V at various rates of C/10, C/5, C/3, C/2, 1C, and 2C rate for 5 cycles at each rate. Cell performance is shown in FIG. 14. This cell shows similar performance compared to the similar cell with no hydrocarbon solvent in FIG. 8. Afterwards, the cell was cycled at 1C rate to measure the lifetime degradation, shown in FIG. 15. Well over 1000 cycles was demonstrated for the electrolyte with the hydrocarbon solvent (Electrolyte 2), which was improved over the electrolyte with no hydrocarbon solvent (Electrolyte 1).

Example 12

Figure 16:
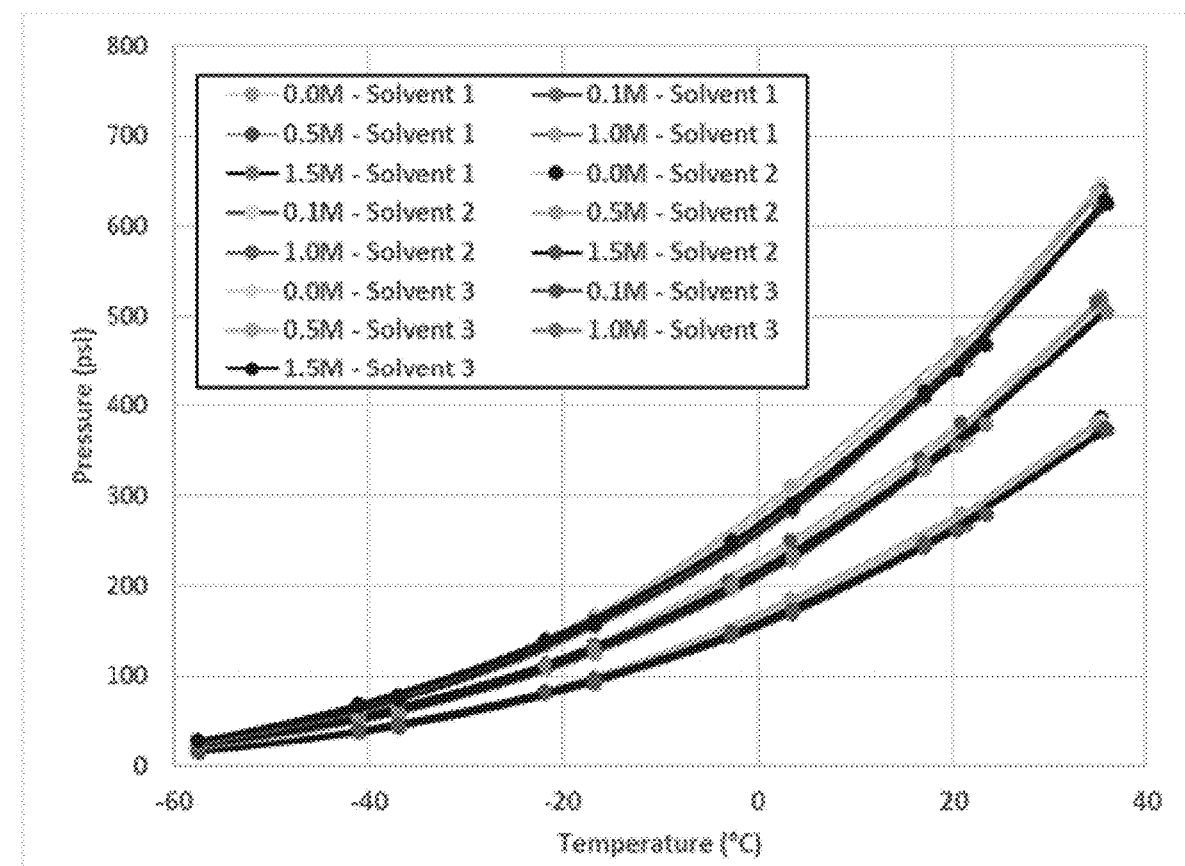
FIG. 16 illustrates the vapor pressure of three electrolytes containing either 0.0, 0.1, 0.5, 1.0, or 1.5M LiTFSI salt, further demonstrating that the salt concentration trigger no change in the vapor pressure of the electrolyte, or if it does trigger a change in vapor pressure, that such a vapor pressure change falls well within the uncertainty of the measurement.

The vapor pressure of several liquefied gas electrolytes was measured with varying quantities of salt. In the findings of FIG. 16, three solvent systems were used: Solvent 1 (45 parts by mole difluoromethane, 45 parts by mole fluoromethane, and 10 parts by mole carbon dioxide), Solvent 2 (31.5 parts by mole difluoromethane, 31.5 parts by mole fluoromethane, 7 parts by mole carbon dioxide, and 30 parts by mole iso-butane), and Solvent 3 (31.5 parts by mole difluoromethane, 31.5 parts by mole fluoromethane, 7 parts by mole carbon dioxide, and 30 parts by mole acetylene). Other than the pure solvent with 0.0M salt, each electrolyte contained LiTFSI and trimethyl phosphate in a 1:2 molar ratio. Each electrolyte contained either 0.0, 0.1, 0.5, 1.0, or 1.5M LiTFSI salt. Vapor pressure curves of each electrolyte are shown in FIG. 16. It is observed that the salt concentration does not correlate to change of the vapor pressure of the electrolyte, or if such a change exists, it lies well within the uncertainty of the measurement. Further, it is demonstrated that the vapor pressure of a liquefied gas electrolyte containing no hydrocarbon (Solvent 1) may be tuned higher (Solvent 3) or lower (Solvent 2) with the addition of various hydrocarbon additives to tune the electrolyte vapor pressure to optimal performance. Again, this is consistent with the finding shown in FIGS. 1 and 2.

Example 13

Figure 17:
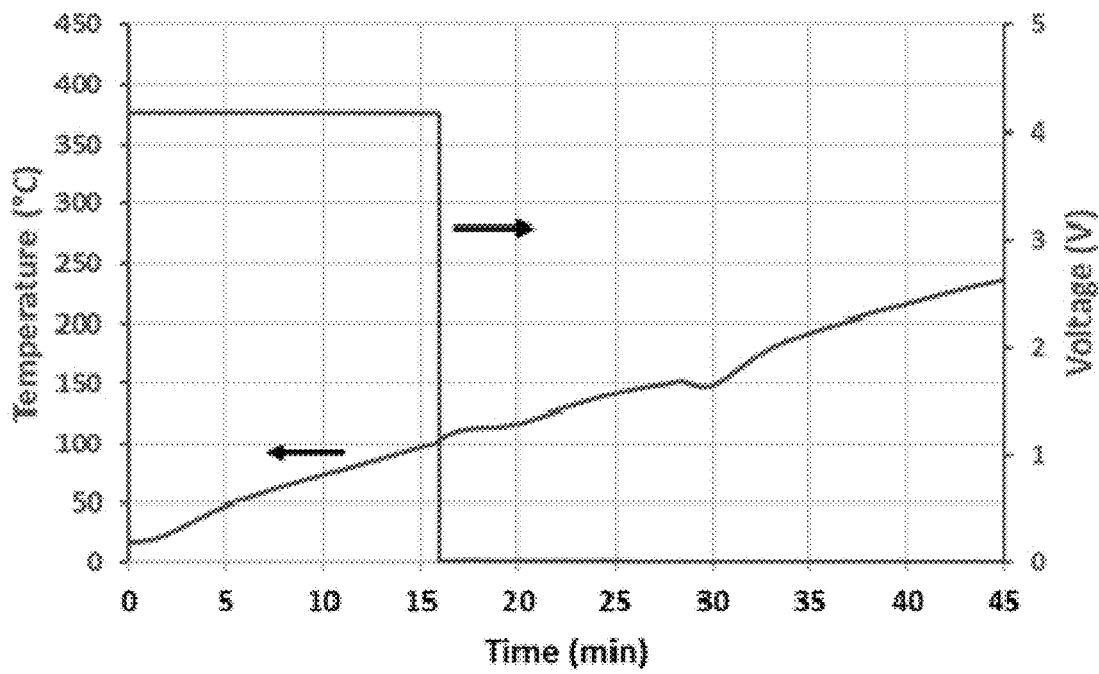
FIG. 17 presents voltage and temperature data of a 2 Ah cell as the cell is heated.

A cell was constructed with a graphite anode and a NMC622 cathode and tested under a thermal ramp test. Temperature was increased at a rate of 5° C. per minute. Voltage and temperature data of the cell are shown in FIG. 17. It is seen that at a temperature of approximately +90° C., the liquefied gas electrolyte pressure reaches the vent pressure of the cell, and the electrolyte is vented to atmosphere, and the voltage immediately drops to zero. After the cell is vented and voltage drops to zero, the cell is continued to heat at the same rate with no reaction observed up to a temperature of +240° C., showing that the cell may fail safely. This remarkable result contrasts with a typical cell, which sees thermal runaway onset at temperatures as low as +100° C. and can reach temperatures as high as +800° C. during the thermal runaway reaction.

Example 14

Figure 18:
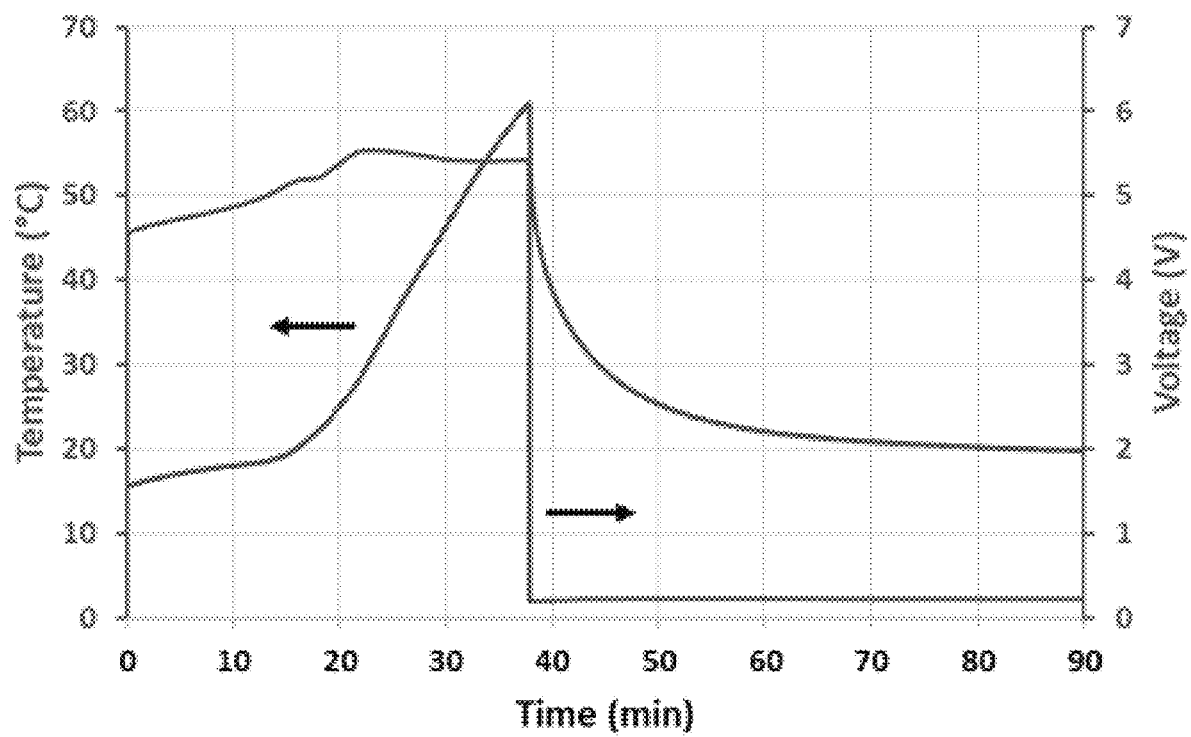
FIG. 18 presents voltage and temperature data of a 2 Ah cell as the cell is overcharged.

A 2-Ah cell was constructed with a graphite anode, a NMC622 cathode and liquefied gas electrolyte and was tested in an overcharge test. The cell was charged at a rate of 2 A, and the voltage and temperature of the cell were observed, with the data shown in FIG. 18. It was seen that as the cell reached an overcharged state of 5.4 V (nominal voltage of cell was 4.2 V); then, the cell over heated and reached a temperature of +60° C., at which point the vapor pressure of the liquefied gas electrolyte was sufficiently high to open the cell vent, thus allowing the liquefied gas electrolyte to rapidly vent to the atmosphere, and thus allowing the cell to fail safely. It was also noted that the vent opened at a temperature lower than expected due to the oxygen evolution from the cathode during the overcharge. This increased oxygen content increased the pressure of the liquefied gas electrolyte and allowed the cell to vent at a lower temperature, thus improving the safety of the cell before there could be a hazardous thermal runaway reaction or an explosion with the oxygen-containing electrolyte. This result is in stark contrast to the safety concerns of conventional Li-ion cells, in which an overcharge test will result in a thermal runaway reaction, a cell explosion, and a hazardous situation.

Example 15

Figure 19:
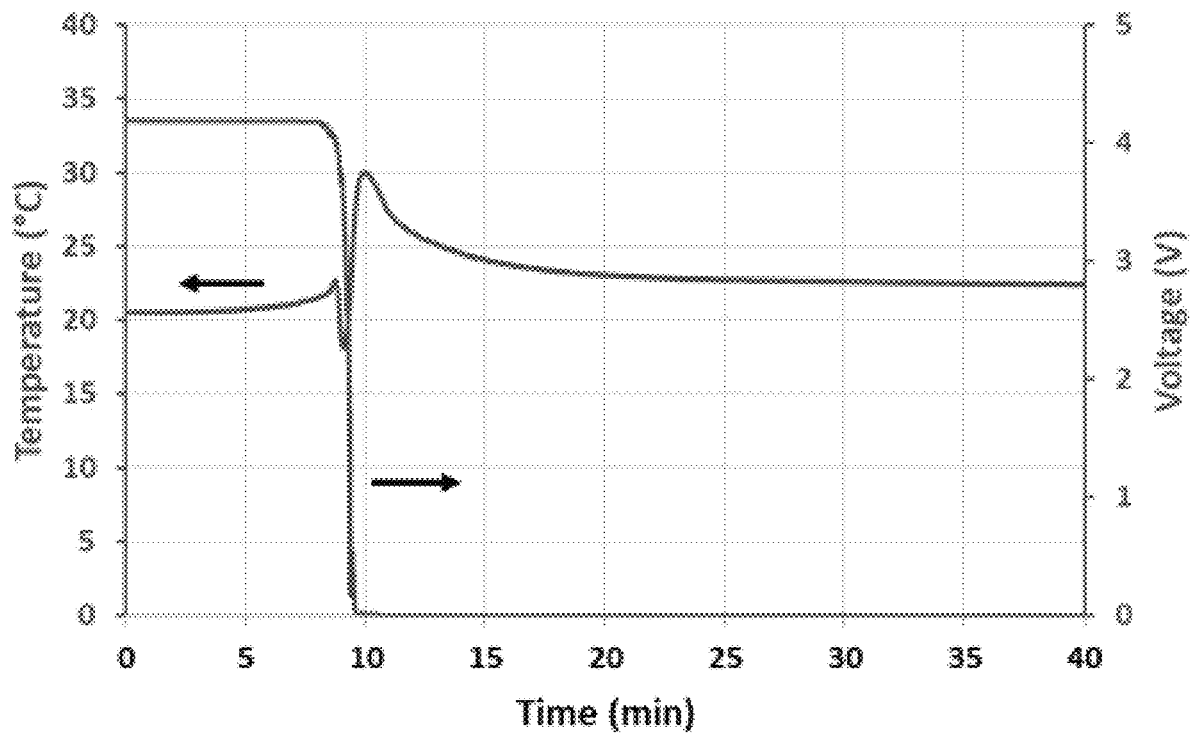
FIG. 19 presents voltage and temperature data of a 2 Ah cell as the cell is crushed.

A 2-Ah cell was constructed with a graphite anode, a NMC622 cathode and liquefied gas electrolyte and was tested under a crush test while the cell was held at a full voltage of 4.2 V. The cell was crushed with a 18 mm-diameter cylindrical impactor at a rate of 1 mm per minute into the center of the cell. The cell temperature and voltage were observed, and the data is shown in FIG. 19. At approximately 9 minutes into the test, it was observed the can was fractured, and the liquefied gas electrolyte was allowed to escape the cell. It was also observed that there was a cell internal short circuit, causing a small increase in the cell temperature, but the electrolyte was allowed to vent off quickly enough to prevent any thermal runaway event from occurring, thus allowing the cell to fail safely. This is in stark contrast to a cell containing conventional liquid electrolyte, which shows thermal runaway during a crush test due to the short-circuiting of the cell.

Construction of an Electrochemical Energy Storage Device

Figure 20A:
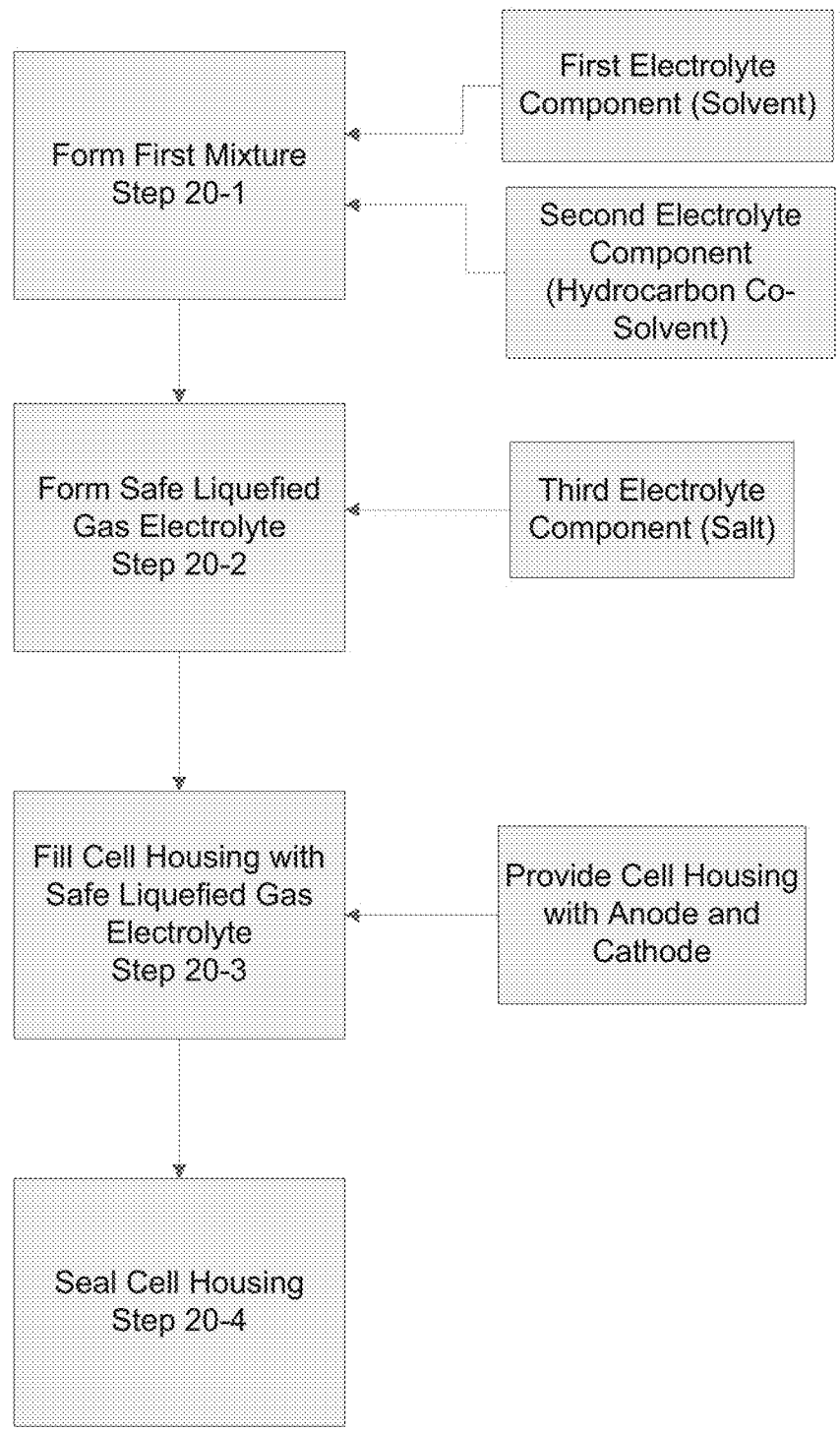
FIG. 20A presents a method for constructing an electrochemical energy storage device with a safe liquefied gas electrolyte.
Figure 20B:
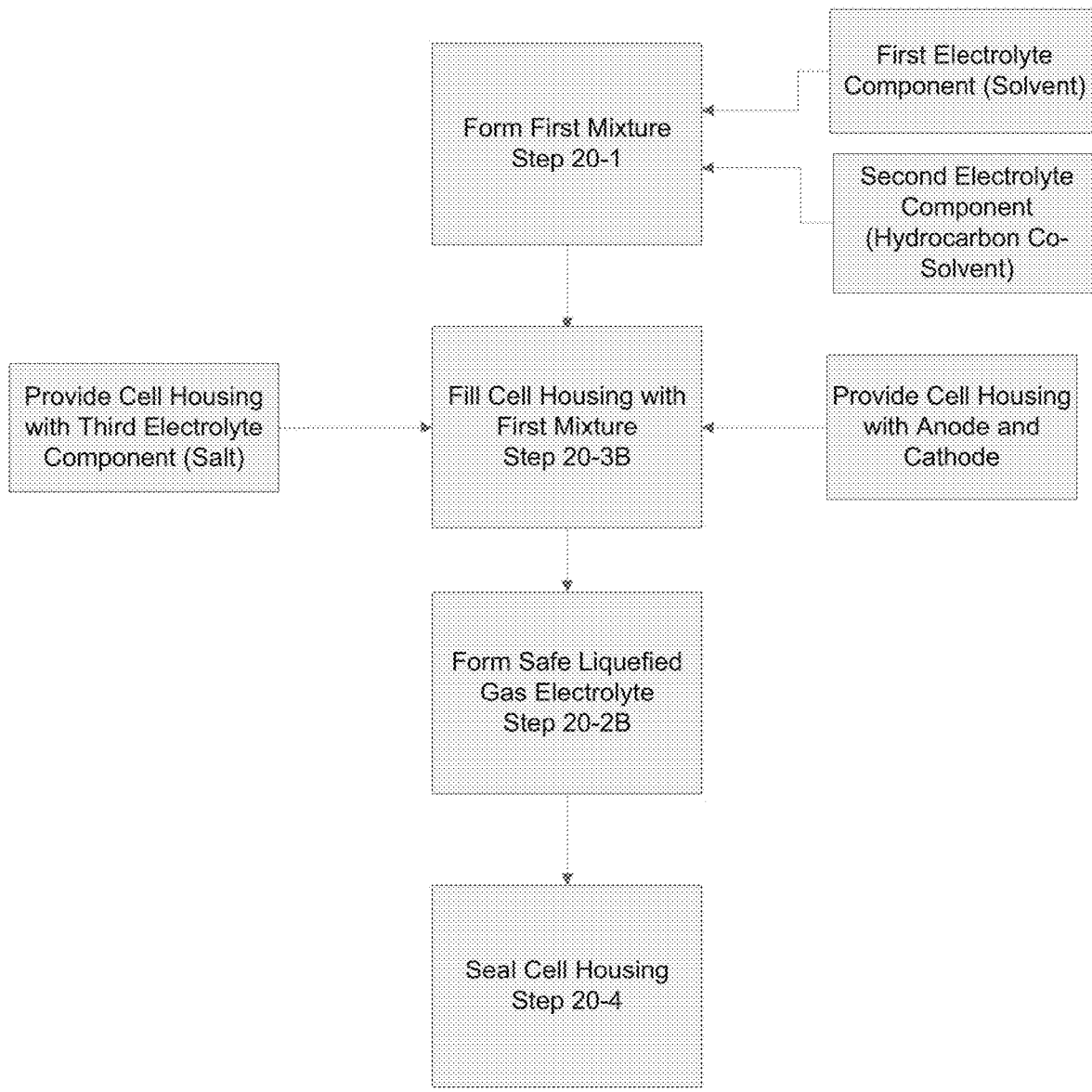
FIG. 20B presents an alternate method for constructing an electrochemical energy storage device with a safe liquefied gas electrolyte.

A method of constructing an electrochemical energy storage device with a safe liquefied gas electrolyte that will gas off at 100 kPa at a temperature of 293.15 K is shown in FIG. 20A. In step 20-1, a first mixture is formed by mixing a first electrolyte component (one or more solvents) with a second electrolyte component (one or more hydrocarbon co-solvents). The addition of the second electrolyte component (1) lowers the vapor pressure of the first mixture by at least 10% compared to the vapor pressure of the first electrolyte component alone, when measured at 293.15 K, and (2) results in a vapor pressure of the first mixture above 100 kPa at a temperature of 293.15 K. The second electrolyte component may also lower the global warming potential (GWP) of the first mixture by at least 10% compared to the GWP of the first component alone. Then in step 20-2, the safe liquefied gas electrolyte is formed by mixing a third electrolyte component (one or more salts) to the first mixture. This safe liquefied gas electrolyte is then added to a cell housing with an anode and a cathode in step 20-3, such that the anode and the cathode are in contact with the safe liquefied gas electrolyte. Alternatively, as shown in FIG. 20B, the third electrolyte component (salt) may first be added to the cell housing; then, the first mixture is added to the cell housing (step 20-3B), mixing with the third electrolyte component (salt) to form the safe liquefied gas electrolyte (step 20-2B). Finally, the cell housing is sealed in step 20-4.

In an exemplary electrochemical device constructed by this method, the electrodes are composed of any combination of two electrodes such as carbons like graphite, graphene, graphene oxide, carbon, activated carbon, or silicon, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide or chemical reaction electrodes such as with chemicals of sulfur, oxygen, carbon dioxide, nitrogen, sulfur dioxide, thionyl fluoride, thionyl chloride fluoride, sulfuryl fluoride, sulfuryl chloride fluoride, or of a metallic electrode with lithium, sodium, zinc, aluminum, magnesium, calcium metal or an alloy of these metals or any combination thereof. The electrodes may further include various binder polymer components, including but not limited to: polyvinylidene fluoride, carboxymethyl cellulose, styrene-butadiene rubber, or polytetrafluoroethylene in order to maintain structural integrity of the electrode. This method can be used to manufacture a battery or a capacitor.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An ionically conducting electrolyte comprising:
   a mixture of a compressed gas solvent and a salt, wherein the compressed gas solvent is selected from the group consisting of dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, difluoro ethylene, nitrous oxide, nitrogen dioxide, nitrogen oxide, carbon disulfide, hydrogen fluoride, hydrogen, and isomers thereof; and
   a hydrocarbon solvent of a sufficient concentration to promote solubility of the salt into the compressed gas solvent without phase separation;
   wherein the molar ratio of the hydrocarbon solvent to the compressed gas solvent is in a range of 10:90 to 90:10.

2. The ionically conducing electrolyte of claim 1, wherein the hydrocarbon solvent:
   lowers the global warming potential (GWP) of the ionically conducting electrolyte by at least 10% compared to the GWP of the compressed gas solvent alone; and
   achieves a pressure of the combined ionically conducting electrolyte and hydrocarbon solvent above 100 kPa at a temperature of 293.15 k.

3. The ionically conducing electrolyte of claim 1, wherein the hydrocarbon solvent lowers the vapor pressure of the ionically conducting electrolyte by at least 20% compared to the vapor pressure of the compressed gas solvent alone when measured at 313.15 K.

4. The ionically conducing electrolyte of claim 1, further comprising an additional component selected from the group consisting of: a linear ether, a cyclic ether, a linear carbonate, a cyclic carbonate, a nitrile, a phosphate, or a combination thereof.

5. The ionically conducing electrolyte of claim 1, wherein the hydrocarbon solvent is an alkane, an alkene, or an alkylene.

6. The ionically conducing electrolyte of claim 1, wherein the hydrocarbon solvent is selected from the group consisting of: methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, and combinations thereof.

* * * * *